(12) United States Patent  
Crocker et al.

(10) Patent No.: US 7,065,779 B1  
(45) Date of Patent: Jun. 20, 2006

(54) TECHNIQUE FOR SYNCHRONIZING MULTIPLE ACCESS CONTROLLERS AT THE HEAD END OF AN ACCESS NETWORK

(75) Inventors: Daniel W. Crocker, San Jose, CA (US); John T. Chapman, Cupertino, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/490,761

(22) Filed: Jan. 24, 2000

Related U.S. Application Data

(60) Provisional application No. 60/159,085, filed on Oct. 13, 1999.

(51) Int. Cl.  
*H04N 7/16* (2006.01)

(52) U.S. Cl. .................. 725/111; 725/114; 725/144; 340/825.2

(58) Field of Classification Search ................. 725/114, 725/116, 117, 144, 146–147, 111; 375/222; 379/90.01, 93.05–93.07; 340/825.2–825.21; 370/503, 448  
See application file for complete search history.

(56) References Cited

U.S. PATENT DOCUMENTS

| | | | | |
|---|---|---|---|---|
| 5,384,563 | A | * 1/1995 | Massey | 340/825.21 |
| 5,751,220 | A | * 5/1998 | Ghaffari | 340/825.21 |
| 5,790,806 | A | * 8/1998 | Koperda | 709/252 |
| 5,854,793 | A | * 12/1998 | Dinkins | 370/503 |
| 6,370,159 | B1 | * 4/2002 | Eidson | 370/503 |

OTHER PUBLICATIONS

Data Over Cable Service Interface Specification, SP–RF1–104–980724, Jul. 24, 1998.*  
3COM, "High–Speed Cable Internet Solutions," http://www.3com.com/cablenow/pdf/7125dsht.pdf, 4 pages (Dec., 1999).

* cited by examiner

*Primary Examiner*—Victor R. Kostak  
*Assistant Examiner*—Matthew Demicco  
(74) *Attorney, Agent, or Firm*—Beyer Weaver & Thomas LLP; Dean E. Wolf, Esq.

(57) ABSTRACT

A technique is described which may be used to synchronize a plurality of different access controllers which control a plurality of distinct ports at the Head End of an access network. In the context of a cable network, the technique of the present invention may be used to synchronize desired upstream and/or downstream channels across different line cards within a Cable Modem Termination System (CMTS). The technique involves utilizing a master time reference device which maintains and updates a current time reference, and periodically distributes synchronization signals to desired line cards in the system in order to synchronize these line cards. In a specific embodiment, the synchronization signals include current timestamp data generated from the master time reference device and distributed to all (or selected) line cards in the system. A slave time reference device on each of the line cards receives the periodic synchronization updates and uses the synchronization data to remain synchronized with the master time reference device. There are also provisions in this protocol to allow for hot insertion and removal of line cards, software reset or loading of the master and/or slave time reference devices, and redundant master time reference devices, including master time reference device fault detection and automatic fail over.

31 Claims, 12 Drawing Sheets

TECHNIQUE FOR SYNCHRONIZING MULTIPLE ACCESS CONTROLLERS AT THE HEAD END OF AN ACCESS NETWORK

RELATED APPLICATION DATA

This invention is related to U.S. Patent Provisional Application Ser. No. 60/159,085, filed on Oct. 13, 1999, naming John T. Chapman and Daniel Crocker as inventors, and entitled "DYNAMIC CHANNEL CHANGE PROPOSAL FOR DOCSIS STANDARD". That application is incorporated. herein by reference in its entirety and for all purposes.

BACKGROUND OF THE INVENTION

This invention relates to digital computer network technology. More specifically, it relates to methods and apparatus for synchronizing components within the Head End of an access network.

Broadband access technologies such as cable, fiber optic, and wireless have made rapid progress in recent years. Recently there has been a convergence of voice and data networks which is due in part to US deregulation of the telecommunications industry. In order to stay competitive, companies offering broadband access technologies need to support voice, video, and other high-bandwidth applications over their local access networks. For networks that use a shared access medium to communicate between subscribers and the service provider (e.g., cable networks, wireless networks, etc.), providing reliable high-quality voice/video communication over such networks is not an easy task.

A cable modem network or "cable plant" employs cable modems, which are an improvement of conventional PC data modems and provide high speed connectivity. Cable modems are therefore instrumental in transforming the cable system into a full service provider of video, voice and data telecommunications services. Digital data on upstream and downstream channels of the cable network is carried over radio frequency ("RF") carrier signals. Cable modems convert digital data to a modulated RF signal for upstream transmission and convert downstream RF signal to digital form. The conversion is done at a subscriber's facility. At a Cable Modem Termination System ("CMTS"), located at a Head End of the cable network, the conversions are reversed. The CMTS converts downstream digital data to a modulated RF signal, which is carried over the fiber and coaxial lines to the subscriber premises. The cable modem then demodulates the RF signal and feeds the digital data to a computer. On the return path, the digital data is fed to the cable modem (from an associated PC for example), which converts it to a modulated RF signal. Once the CMTS receives the upstream RF signal, it demodulates it and transmits the digital data to an external source.

FIG. 1 is a block diagram of a typical two-way hybrid fiber-coaxial (HFC) cable network system. It shows a Head End 102 (essentially a distribution hub) which can typically service about 40,000 homes. Head End 102 contains a CMTS 104 that is needed when transmitting and receiving data using cable modems. Primary functions of the CMTS include (1) receiving baseband data inputs from external sources 100 and converting the data for transmission over the cable plant (e.g., converting Ethernet or ATM baseband data to data suitable for transmission over the cable system); (2) providing appropriate Media Access Control (MAC) level packet headers for data received by the cable system, and (3) modulating and demodulating the data to and from the cable system.

Head End 102 connects through pairs of fiber optic lines 106 (one line for each direction) to a series of fiber nodes 108. Each Head End can support normally up to 80 fiber nodes. Pre-HFC cable systems used coaxial cables and conventional distribution nodes. Since a single coaxial cable was capable of transmitting data in both directions, one coaxial cable ran between the Head End and each distribution node. In addition, because cable modems were not used, the Head End of pre-HFC cable systems did not contain a CMTS. Returning to FIG. 1, each of the fiber nodes 108 is connected by a coaxial cable 70 to two-way amplifiers or duplex filters 72, which permit certain frequencies to go in one direction and other frequencies to go in the opposite direction (different frequency ranges are used for upstream and downstream paths). Each fiber node 108 can normally service up to 500 subscribers. Fiber node 108, coaxial cable 70, two-way amplifiers 72, plus distribution amplifiers 74 along with trunk line 76, and subscriber taps, i.e. branch lines 78, make up the coaxial distribution system of an HFC system. Subscriber tap 78 is connected to a cable modem 120. Cable modem 120 is, in turn, connected to a subscriber computer 122.

In order for data to be able to be transmitted effectively over a wide area network such as HFC or other broadband computer networks, a common standard for data transmission is typically adopted by network providers. A commonly used and well known standard for transmission of data or other information over HFC networks is DOCSIS. The DOCSIS standard has been publicly presented by Cable Television Laboratories, Inc. (Louisville, Colo.) in document control number SP-RFIv1.1-I02-990731, Jul. 31, 1999. That document is incorporated herein by reference for all purposes.

Data Communication in Cable Networks

In conventional DOCSIS systems, the CMTS may include a plurality of physically distinct line cards having appropriate hardware for communicating with cable modems in the network. Each line card is typically assigned to a separate DOCSIS domain, which is a collection of downstream and upstream channels for which a single MAC Allocation and Management protocol operates. Typically, each DOCSIS domain includes a single downstream channel and one or more upstream channels. The downstream channel is used by the CMTS to broadcast data all cable modems (CMs) with that particular domain. Only the CMTS may transmit data on the downstream. In order to allow the cable modems of a particular DOCSIS domain to transmit data to the CMTS, the cable modems share one or more upstream channels within that domain. Access to the upstream channel is controlled using a time division multiplexing (TDM) approach. Such an implementation requires that the CMTS and all cable modems sharing an upstream channel within a particular domain have a common concept of time so that when the CMTS tells a particular cable modem to transmit data at time T, the cable modem understands what to do. "Time" in this context is tracked using a counter, commonly referred to as a timestamp counter, which, according to conventional implementations is a 32-bit counter that increments by one every clock pulse.

In conventional CMTS configurations, each line card in the system includes a separate MAC controller which is responsible for implementing a DOCSIS MAC protocol between the CMTS and the cable modems serviced by that particular line card. Each MAC controller has its own unique timestamp counter which generates its own local time reference. Thus, each line card in the system operates according to its own local time reference, and is not synchronized with other line cards in the system. Further, each line card in the system periodically distributes a timestamp value of its local time reference to the respective group of cable modems serviced by that line card. For this reason, a first group of cable modems serviced by a first line card will not be in synchronization with a second group of cable modems serviced by a second line card at the CMTS. While such a configuration provides for simplicity in terms of implementation, it may not be the most advantageous configuration for handling new and emerging broadband network applications such as video-on-demand, telephony, etc. Accordingly, there exists a continual need to improve access network configurations in order to accommodate new and emerging network applications and technologies.

SUMMARY OF THE INVENTION

According to specific embodiments of the present invention, a method and computer program product are provided for synchronizing time reference devices of an access network. The access network comprises a Head End and a plurality of nodes. The Head End includes an access control system having a plurality of media access controllers. Each media access controller is configured or designed to control a respective interface to the access network. The plurality of media access controllers includes a first distinct access controller for controlling a first interface, and a second distinct access controller for controlling a second interface. The first interface includes a first distinct plurality of ports for communicating with at least a first portion of the network nodes. The second interface includes a second distinct plurality of ports for communicating with at least a second portion of the network nodes. The first and second access controllers include a first and a second time reference device, respectively. At least one synchronization signal is provided to the first and second access controllers. The first and second access controllers then utilize the synchronization signal in a manner which results in the first and second time reference devices being in synchronization. By synchronizing each of the time reference devices of a selected group of access controllers, the corresponding interfaces associated with the selected group of access controllers will also be synchronized. In this way, it is possible to synchronize upstream and/or downstream channels across different line cards at the Head End of the access network.

Additional embodiments of the present invention are directed to a method and computer program product for configuring an access network. The access network comprises a Head End and a plurality of nodes. The Head End includes an access control system having a plurality of media access controllers. Each of the plurality of media access controllers includes a distinct time reference device. Further, each of the media access controllers is configured or designed to control a respective interface to the access network. Each interface includes a distinct plurality of ports for communicating with at least a portion of the plurality of nodes. The time reference devices corresponding to the plurality of access controllers are configured to be in synchronization with each other. By synchronizing each of the time reference devices of a selected group of access controllers, the respective interfaces associated with this group of access controllers will also be synchronized. Selected ports from the plurality of interfaces may then be assigned to particular domains within the access network. In a specific embodiment, each domain corresponds to a DOCSIS domain of a cable network. An additional aspect provides that, where a specific interface includes at least two distinct downstream channels, at least one of the downstream channels may be assigned to a first domain, and at least one of the other downstream channels may be assigned to a second domain.

Further embodiments of the present invention provide a method and computer program product for synchronizing nodes in an access network to a common time reference. The access network includes a Head End and a plurality of nodes. The Head End includes an access control system for managing and coordinating access between the Head End and the plurality of nodes. The access control system comprises a plurality of media access controllers, each of which includes a distinct time reference device. Each of the media access controllers may be used to control a respective interface to the access network. Each interface comprises a plurality of distinct ports for communicating with at least a portion of the network nodes. A first time reference message is provided to a first network node via a first downstream channel. The first downstream channel is associated with a first media access controller and a corresponding first interface. The first time reference message is generated from a first time reference device associated with the first media access controller. A second time reference message is provided to a second network node via a second downstream channel. The second downstream channel is associated with a second media access controller and a corresponding second interface. The second time reference message is generated from a second time reference device associated with the second media access controller. The first and second time reference devices are synchronized with each other. The first time reference message is used to synchronize a time reference device at the first node with the first time reference device. The second time reference message is used to synchronize a time reference device at the second node with the second time reference device. In this way, the first and second network nodes may be synchronized with each other. Further, according to an additional aspect of this embodiment, the first and second nodes may be synchronized even if they reside on separate domains in the network.

An additional embodiment of the present invention is directed to a Head End of an access network which comprises a plurality of nodes. The Head End includes a master time reference device which maintains and updates a current time reference. The Head End further includes a plurality of physically distinct network interfaces to the access network. Each network interface comprises a group of distinct ports to nodes on the access network and a further comprises a slave time reference device in communication with the master time reference device. Each network interface is configured or designed to obtain the current time reference from the master time reference device. The plurality of network interfaces are further configured or designed to simultaneously update their respective slave time reference devices using the current time reference in a manner which permits the plurality of network interfaces to be in synchronization. An additional aspect of this embodiment provides that the Head End also includes a back-up master time reference device for maintaining and updating the current time reference, and for providing the current time reference to each of the slave time reference devices at times when a failure is detected at the master time reference device.

Another embodiment of the present invention is directed to a Head End of an access network which includes a plurality of nodes. The Head End comprises a master time reference device which maintains and updates a current time reference. The Head End also comprises a plurality of slave media access controllers in communication with a master time reference device. Each slave media access controller is responsive to control signals from the master time reference device to use the current time reference to synchronize itself with the other slave media access controllers at the Head End. An additional aspect of this embodiment provides that each of the plurality of media access controllers is configured or designed to control a respective interface to the access network. Each of the network interfaces includes a distinct plurality of ports for communicating at least a portion of the network nodes. A further aspect provides that the plurality of network interfaces are in synchronization with each other by virtue of the fact that each of the slave media access controllers driving the respective network interfaces are in synchronization.

Additional features and advantages of the various aspects of the present invention will become apparent from the description of its preferred embodiments, which description should be taken in conjunction with the accompanying drawings.

DETAILED DESCRIPTION OF THE PREFERRED EMBODIMENT

Figure 1:
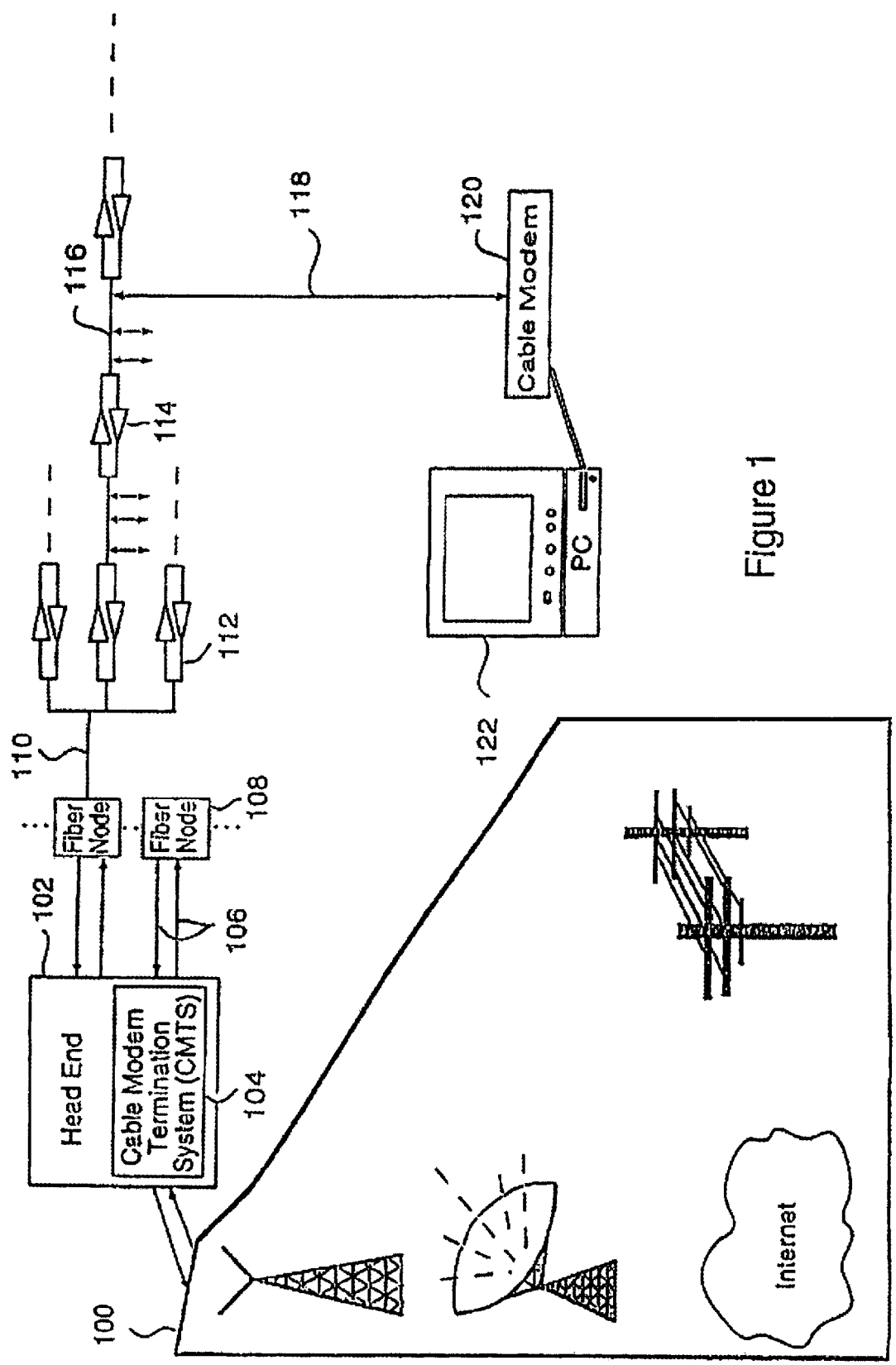
FIG. 1 shows a specific embodiment of a cable network which may be used with the technique of the present invention.
Figure 2:
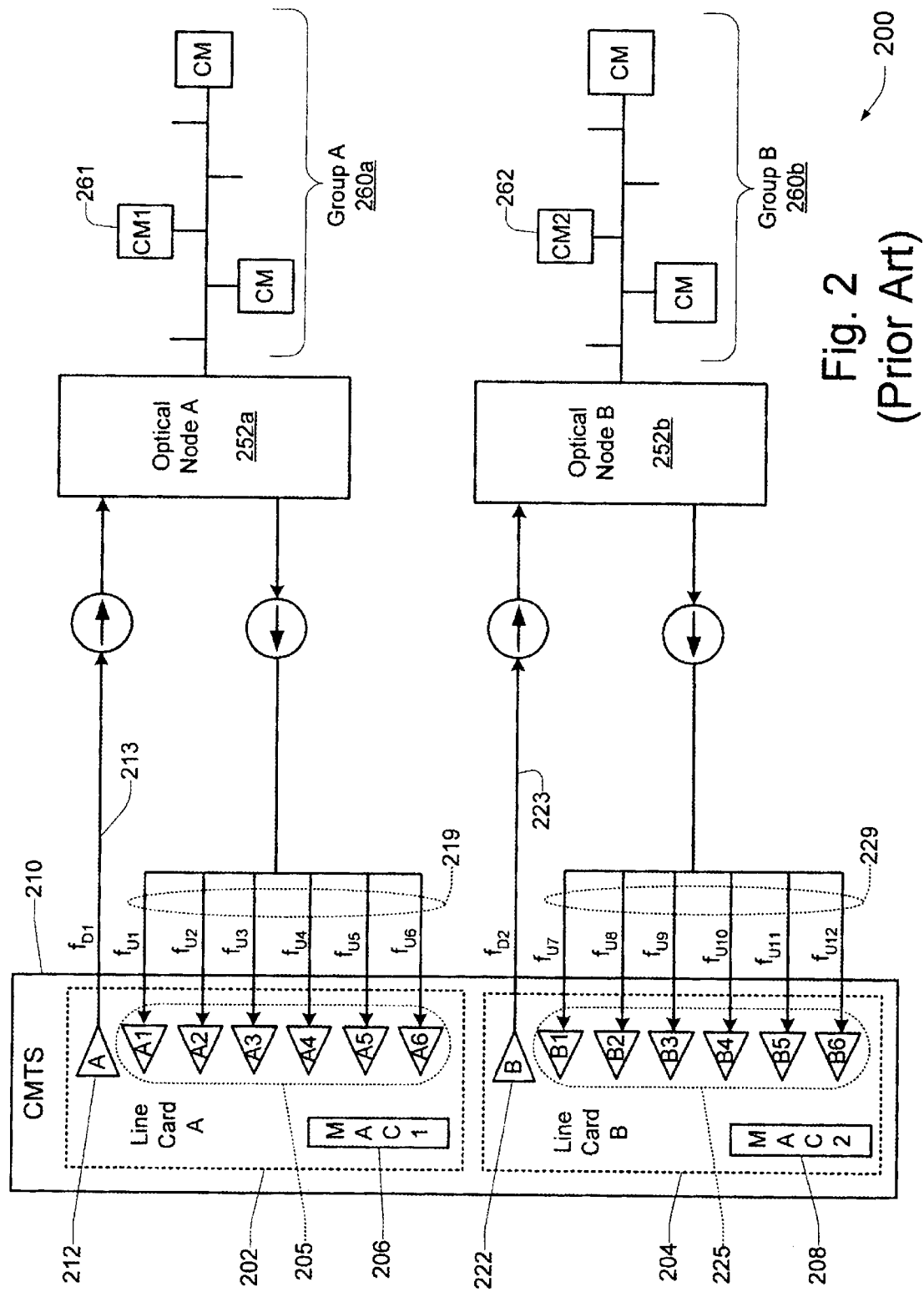
FIG. 2 shows a block diagram of a conventional implementation of a cable network 200.

"FIG. 2 shows a block diagram of a conventional configuration for a cable network 200. As shown in FIG. 2, the CMTS 210 may include a plurality of physically distinct line cards, e.g. line card A 202 and line card B 204. Each line card provides a separate interface for communicating with a specific group of cable modems in the network. For example, line card A 202 includes a distinct group of ports (e.g., 205, 212) for communicating with cable modem Group A 260*a*, and line card B includes a separate distinct group of ports (e.g., 225, 222) for communicating with cable modem Group B 260*b*.

Each line card within CMTS 210 includes a separate MAC controller for controlling the group of ports which reside on that physical line card. For example, on line card A, MAC controller 206 controls downstream transmitter 212 and the plurality of upstream receivers 205. Similarly, the MAC controller 208 on line card B controls downstream transmitter 222 and the plurality of upstream receivers 225.

As described briefly in the background of this application, each MAC controller includes its own unique timestamp counter for generating a local time reference specific to the particular line card on which it resides. Thus, for example, MAC controller 206 includes a first timestamp counter (not shown) which generates a local time reference to be used by line card A for communicating with the plurality of Group A cable modems. Likewise, MAC controller 208 includes its own timestamp counter (not shown) for generating a local time reference to be used by line card B for communicating with the Group B cable modems. In conventional CMTS systems, the timestamp counters which reside on different line cards are not synchronized.

Because data-over-cable service is a relatively new and emerging technology, conventional cable networks have been designed to be efficient in handling burst data transmissions from the plurality of network cable modems to the CMTS. Additionally, conventional cable network configurations are designed to take into account the asymmetrical bandwidth allocation on the upstream and downstream channels. For example, a downstream channel will typically have a bandwidth of 30–50 Mbps, and an upstream channel will typically have a bandwidth of 1–10 Mbps. In taking the above factors into account, it is common practice to statically configure each line card to include a single downstream channel transmitter and a predetermined number of upstream channel receivers (up to a maximum of 6 upstream receivers).

Due to the static configuration of conventional cable networks such as that shown in FIG. 2, it is common practice to assign the downstream and upstream channels of each physical line card within the CMTS to a unique DOCSIS domain. By assigning each line card (and its associated downstream and upstream channels) to a unique DOCSIS domain, one is able to take full advantage of the limited addressing space available within each DOCSIS domain. In the example of FIG. 2, line card A is associated with domain A which includes one downstream A channel 213 and six upstream A channels 219. The cable modems which use the domain A downstream and upstream channels to communicate with the CMTS (e.g., Group A cable modems 260*a*) are considered to be part of domain A and share a common address map specific to domain A. The downstream signals are carried to optical node A 252*a*. Similarly, line card B is associated with domain B, which includes a single downstream B channel 223, and a plurality of upstream B channels 229. The downstream signals are carried to optical node B 252*b*. The cable modems of Group B (260*b*) which use the domain B upstream and downstream channels to communicate with the CMTS are considered to be part of domain B, and share a common address map specific to domain B.

Because conventional line cards are configured to include at most six upstream receivers, it is not possible for a cable operator (or other service provider) to configure a cable network to have a DOCSIS domain which includes, for example, one downstream channel and eight upstream channels. Even if two extra upstream channels were available on a separate line card, it would not be possible to include these two extra channels in the DOCSIS domain associated with the first line card. This limitation is depicted by way of example with reference to FIG. 2B of the drawings.

Figure 2B:
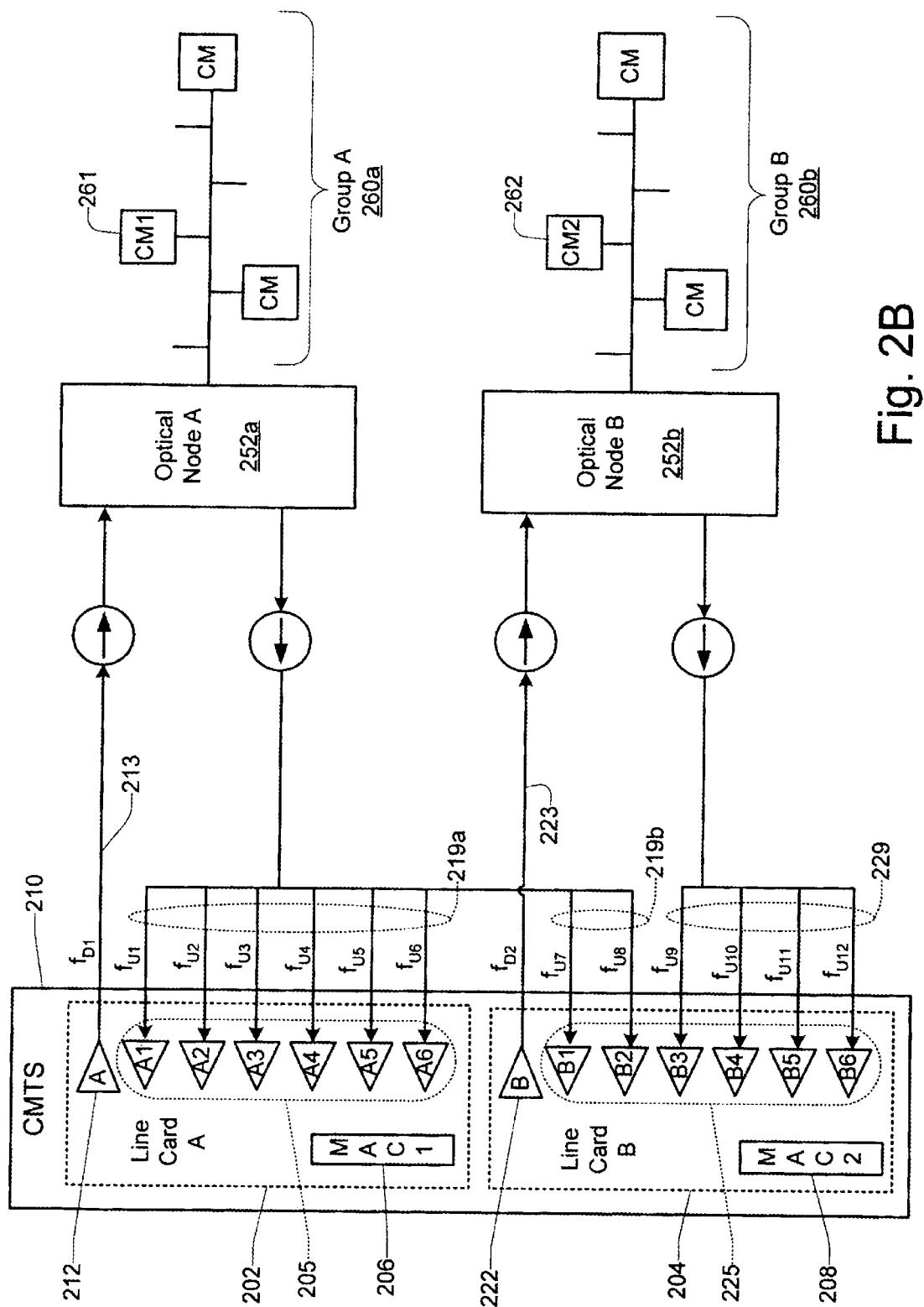
FIG. 2B shows a block diagram of an alternate embodiment of a conventional implementation of a cable network.

FIG. 2B shows a block diagram of an alternate embodiment of a conventional implementation of a cable network. A primary difference between the cable network of FIG. 2B and that of FIG. 2 is that, in FIG. 2B, upstream receiver ports B1 and B2 of line card B are connected to the Group A cable modems 260a. In the example of FIG. 2B, it is assumed that the cable operator desires to configure two separate DOCSIS domains such that the first DOCSIS domain (domain A) includes a single downstream channel and eight upstream channels, and the second DOCSIS domain (domain B) includes a single downstream channel and four upstream channels.

One technique for implementing the above-described DOCSIS domains is illustrated by the configuration of FIG. 2B. As shown in FIG. 2B, two upstream receivers B1 and B2 from line card B are assigned to domain A and physically connected to the cable modems of Group A. Thus, in the embodiment of FIG. 2B, domain A includes one downstream channel A 213 and 8 upstream channels 219a, 219b. Domain B includes downstream channel B 223, and four upstream channels 229.

Unfortunately, conventional cable networks are not configured to support the configuration illustrated in FIG. 2B. More specifically, in conventional cable networks, it is not possible for a cable modem to "listen" to the CMTS on a downstream channel associated with a first line card, and "talk" to the CMTS on an upstream channel associated with a different line card. Thus, as shown in FIG. 2B, the cable modems of domain A (e.g. Group A 260a) are not able to "listen" to the CMTS on downstream channel A (213) and "talk" to the CMTS using upstream channels 219b (associated with receivers B1 and B2). This is because line card A uses a different time reference than that of line card B. More specifically, the time reference for downstream channel A is generated by a local timestamp counter within MAC controller 206, and the time reference for downstream channel B is generated by a different timestamp counter within MAC controller 208. Moreover, the timestamp counters of MAC controllers 206 and 208 are not synchronized, meaning that the time reference for line card A is different than the time reference for line card B.

In order to understand why the configuration of FIG. 2B would not work in conventional cable networks, it is helpful to review the protocol by which a cable modem communicates with the CMTS. Using cable modem CM1 (261) as an example, in order for CM1 to transmit data to the CMTS, it first sends a data grant request to the CMTS on a predetermined upstream channel (e.g., channel A1). When the MAC controller 206 receives this request, it schedules a future time slot on the A1 channel for the CM1 modem to transmit its data. This time slot is conventionally referred to as a data grant slot. The MAC controller 206 is responsible for scheduling data grants for all upstream channels within its domain (e.g., domain A). The data grants for each upstream channel are compiled by the MAC controller and incorporated into MAP messages to be broadcast to cable modems using that particular upstream channel. The channel MAP message will include instructions to each cable modem requesting a data grant to transmit its data at a specific time. As described previously, "time" in this context is tracked using a local time stamp counter which is part of the MAC1 controller 206. In order to assure that each of the cable modems using a particular domain A upstream channel are synchronized with the MAC1 controller, the MAC1 controller periodically broadcasts a current timestamp message (or timestamp value) to each of the domain A cable modems via the downstream A channel 213. The domain A cable modems then use this timestamp message to synchronize their internal timestamp counter with the timestamp counter of the MAC1 controller.

In the configuration of FIG. 2B, if cable modem CM1 is configured, for example, to "listen" to the CMTS on downstream channel A (213) and configured to "talk" to the CMTS on upstream channel B1 (which is part of domain A), it follows that CM1 will receive timestamp messages (via downstream channel A) which correspond to the timestamp counter of line card A. However, the cable modem CM1 is configured to "talk" with the CMTS via upstream channel B1 which resides on line card B. Thus, in order for CM1 to transmit data on upstream channel B1, it must first receive a data grant timeslot. Conventionally, the data grant time slot is specified in a MAP message for upstream channel B1. Since the upstream channel B1 receiver physically resides on line card B, the timeslot allocated for CM1 to transmit its data will be expressed in terms of the local time reference of line card B. Thus, cable modem CM1 would need to be synchronized with line card B in order to properly transmit its data to the CMTS via upstream port B1. Since CM1 and the other modems of domain A (Group A) are synchronized with line card A, none of the domain A modems would be able to transmit data to the CMTS via upstream channels B1 or B2 (219b). For this reason, using conventional techniques, it is undesirable to group together, within a single domain, different upstream ports that reside on different line cards within the CMTS. However, using the technique of the present invention, it is possible to configure a single domain which includes a plurality of upstream channels in which a first portion of the upstream channels is associated with ports residing on a first line card, and a second portion of upstream channels is associated with ports residing on a second line card.

The technique of the present invention involves utilizing a master time reference device which maintains and updates a current time reference, and periodically distributes synchronization signals to desired line cards in the system in order to synchronize these line cards. In a specific embodiment, the synchronization signals include current timestamp data generated from the master time reference device and distributed to all (or selected) line cards in the system. A slave time reference device on each of the line cards receives the periodic synchronization updates and uses the synchronization data to remain synchronized with the master time reference device. There are also provisions in this protocol to allow for hot insertion and removal of line cards, software reset or loading of the master and/or slave time reference devices, and redundant master time reference devices, including master time reference device fault detection and automatic fail over.

Figure 3:
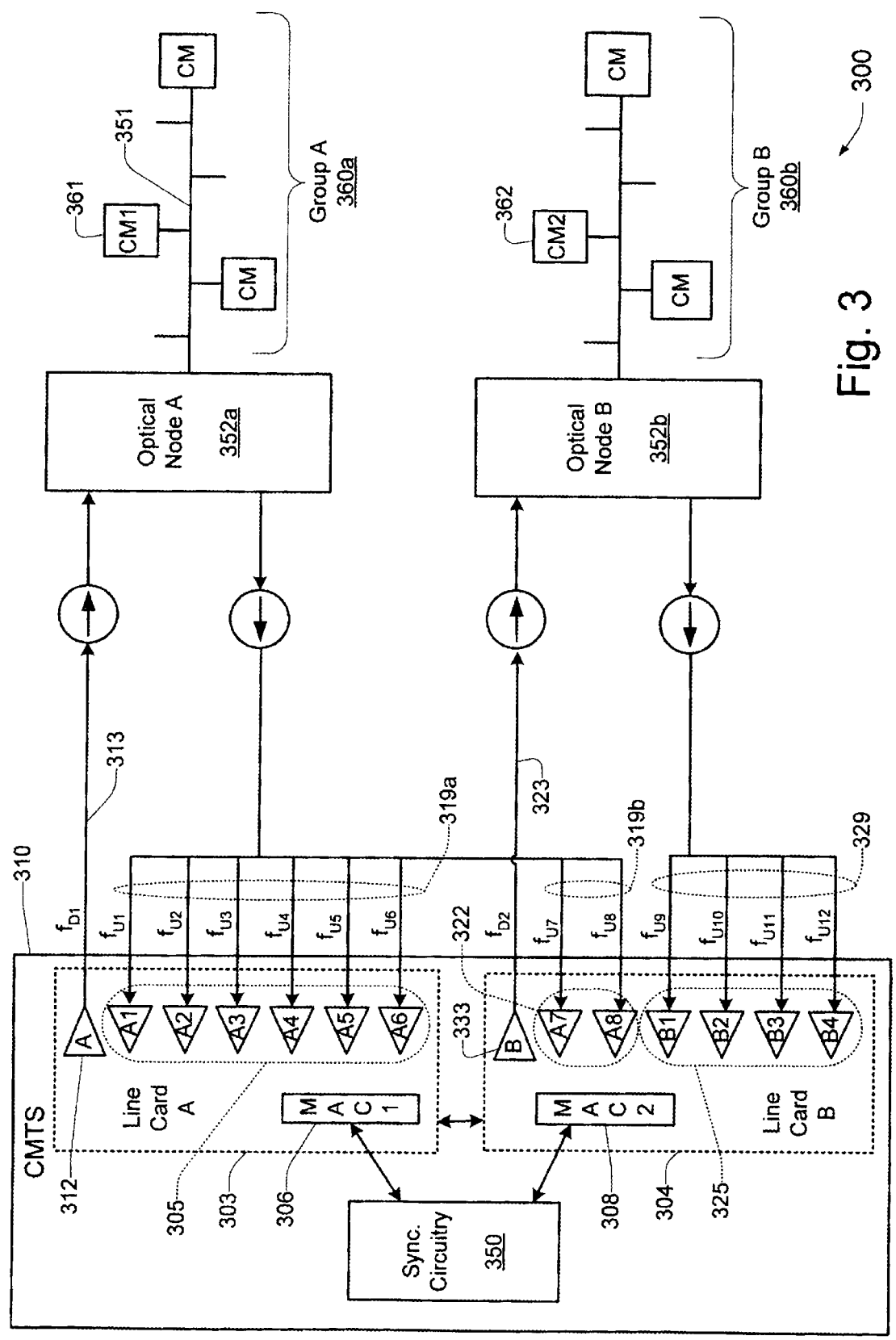
FIG. 3 shows a block diagram of a specific implementation of a cable network 300 in accordance with a specific embodiment of the present invention.

FIG. 3 shows a block diagram of a specific implementation of a cable network 300 in accordance with a specific embodiment of the present invention. As shown in FIG. 3, a synchronization circuit 350 is included at the head end of the cable network. The synchronization circuit 350 includes a master time reference device, which, in a specific embodiment, is a timestamp counter referred to as the system timestamp master. As explained in greater detail below, the synchronization circuitry 350 may include hardware and/or software which is used to synchronize selected line cards within the CMTS. In a specific embodiment, the synchronization circuitry resides within CMTS 310. However, in an alternate embodiment (not shown), the synchronization circuitry may reside outside the CMTS.

Referring to FIG. 3, a master time reference device (not shown) located within synchronization circuit 350 maintains and updates current time reference data, and periodically distributes synchronization signals to each (or a selected portion) of the MAC controllers (e.g., 306, 308) within the CMTS in order to synchronize the time reference devices located in each of the MAC controllers. The synchronization information includes current time reference data generated by the master time reference device. In a specific embodiment, the current time reference data is a timestamp value generated from the master timestamp counter. Each MAC controller receiving the synchronization data is configured to use the current time reference value to synchronize its internal time reference device (e.g., timestamp counter) with the master time reference device. The time reference devices which reside in the MAC controllers may be referred to as slave time reference devices (or slave timestamp counters). By synchronizing each of the slave time reference devices with a master time reference device, each MAC controller within the CMTS may be synchronized with the other MAC controllers within the CMTS, thereby resulting in each of the line cards within the CMTS being in synchronization.

Using the technique of the present invention, it is possible to configure a single DOCSIS domain to include a plurality of upstream and/or downstream ports from physically different line cards, as shown, for example in FIG. 3. For example, as shown in FIG. 3, two upstream channel receivers A7 and A8 (322) from line card B have been assigned to domain A and grouped together with the ports 305 and 312 of line card A. As described in greater detail below, any cable modem of domain A (i.e. Group A 360*a*) may be configured to "listen" to the CMTS via a downstream channel on line card A (e.g., downstream channel A, 313), and to "talk" to the CMTS via any one of the plurality of domain A upstream channel receivers A1–A6, A7, A8.

For purposes of illustration, the example described above with respect to FIG. 2B will now be applied to the network configuration of FIG. 3. In this example it is assumed, that cable modem CM1 361 is configured to receive information from the CMTS via downstream channel A 313, and configured to transmit data to the CMTS via upstream channel A7 (of 319*b*). Since cable modem CM1 is configured to receive information from the CMTS via downstream channel A, it follows that the CM1 modem will synchronize itself with the line card A time reference by utilizing the timestamp messages generated by the MAC1 controller 306 and broadcast to the Group A cable modems via downstream channel A 313. In accordance with the technique of the present invention, however, the MAC1 timestamp counter (of line card A) is in synchronization with the MAC2 timestamp counter (of line card B). Accordingly, it follows that, by synchronizing itself with the MAC1 timestamp counter, cable modem CM1 is also in synchronization with the MAC2 timestamp counter.

When the CM1 modem wishes to transmit data to the CMTS, it sends a data grant request to the CMTS via upstream channel A7. In a specific embodiment packets sent by any of the cable modems to the CMTS are received at a central location, regardless of the particular upstream channel used. The CMTS includes software and/or hardware for receiving the packets, interpreting the packets, and forwarding the packets. Additionally, in the example of FIG. 3, the Head End will include additional hardware and/or software for managing one or more DOCSIS domains across a plurality of line cards. This additional hardware and/or software allows the CMTS to know specifically how each of the different domains are mapped and grouped. For example, referring to FIG. 3, the CMTS will know that downstream channel A 313 is to be used for communicating with cable modems using upstream channels A7 or A8 (319*b*), and that downstream channel B 323 is to be used for communicating with cable modems using upstream channels B1–B4 (329). In a specific embodiment, the additional hardware and/or software resides within the CMTS. Alternatively, the additional hardware and/or software may reside outside the CMTS.

Further, according to a specific embodiment, the logic for generating channel MAP messages resides at some central location within the CMTS, and does not reside on the individual line cards. In an alternate embodiment, each line card will include additional hardware and/or software for generating channel MAP messages for the upstream channels associated with that particular line card. In this latter embodiment, additional hardware and/or software may also be included for allowing channel MAP messages generated from a first line card to be broadcast on the downstream channel(s) of a different line card. Thus, for example, as shown in FIG. 3, when a data grant request is received from cable modem CM1 on upstream channel A7, a device within the CMTS responds to this request by scheduling a data grant for the CM1 modem in the next channel A7 MAP message. In one embodiment, the channel A7 MAP message is generated by the MAC2 controller 308. In an alternate embodiment, the channel A7 MAP message is generated by the MAC1 controller 306. Alternatively, the channel A7 MAP message may be generated by another device (not shown) within the CMTS. After the channel A7 MAP message has been generated (which includes a data grant for cable modem CM1), appropriate hardware and/or software within the CMTS forwards this MAP message to line card A so that the MAP message may be broadcast to the cable modems of Group A that utilize upstream channel A7. When the cable modem CM1 receives the channel A7 MAP message, it will be instructed to transmit its data (on upstream channel A7) at time T1. In this example, it is assumed that the time T1 is based upon the local time reference associated with line card B. Even though cable modem CM1 is synchronized with line card A, it may still use its internal timing device to transmit its data at time T1 since line card A is synchronized with line card B.

Figure 3B:
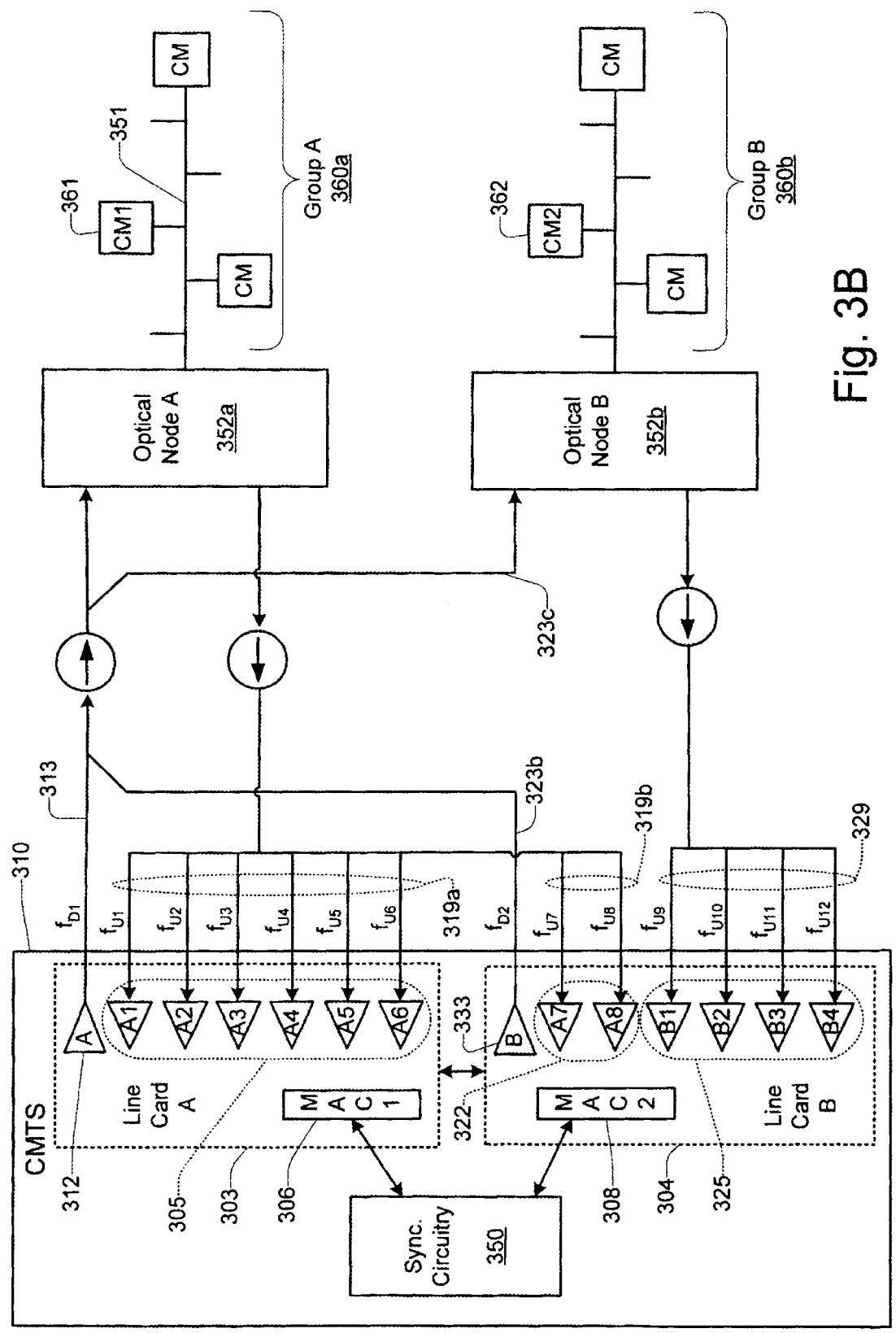
FIG. 3B shows a block diagram of an alternate implementation of a cable network in accordance with a specific embodiment of the present invention.

In order to illustrate how the technique of the present invention may be used to overcome some of the limitations associated with conventional cable network configurations, an example of a video-on-demand application will now be described using the network shown in FIG. 3B. The embodiment of FIG. 3B is similar to that of FIG. 3, however, in FIG. 3B, downstream channel A (313) and downstream channel B (323*b*) are RF combined and connected to a single optical fiber which carries the downstream signals to both optical node A 352*a* and optical node B 352*b*. Thus, each of the cable modems within Group A (360*a*) and Group B (360*b*) are able to receive both downstream channel A and downstream channel B.

In this example using FIG. 3B, it is assumed that each downstream channel (313, 323*b*) is provided sufficient bandwidth for simultaneously broadcasting a plurality of different movies or other video data. Further, it is assumed that a user connected to cable modem CM1 (361) has previously been watching a movie on downstream channel A, and communicates with the CMTS via upstream channel A1. In this example, the user at CM1 now wishes to watch a movie which will be broadcast on downstream channel B. At this point, the CMTS has a number of different options by which to proceed. First, the CMTS may provide the desired movie to CM1 on downstream channel A. However, even assuming that the cable operator has the additional bandwidth to provide this movie on downstream channel A, this option is undesirable as it is considered to be a waste of resources to broadcast the identical movie on two different downstream channels. Alternatively, a preferred solution would be for the CMTS to instruct the cable modem CM1 to switch downstream channels and receive the movie on downstream channel B.

In conventional cable networks, this option would not available to the CMTS since, without synchronization between the two line cards A and B, it would not be possible for the cable modem CM1 to "listen" to the CMTS on downstream channel B and "talk" to the CMTS on upstream channel A1. However, using the synchronization technique of the present invention, the CM1 cable modem is able to obtain current timestamp data from downstream channel B (associated with line card B), and use this current timestamp data to synchronize itself with line card A in order to "talk" to the CMTS via upstream channel A1.

Thus, referring to FIG. 3B, the synchronization circuitry 350 causes each of the timestamp counters within each respective MAC controller (306,308) to be in synchronization. Accordingly, cable modem CM1 (361) is able to use the timestamp message on downstream channel B (323*b*) to communicate with the upstream receivers 305 on line card A. Thus, referring to the video-on-demand example (described above), when the cable modem CM1 sends a request to the CMTS to view a movie which is currently being broadcast on downstream channel B, the CMTS may respond by instructing the cable modem to switch its downstream channel from downstream A to downstream B. The cable modem CM1 is then able to "listen" to the CMTS on downstream channel B, and "talk" to the CMTS using any one of the upstream A channels 319*a*, 319*b*. In a specific embodiment, the CMTS includes software to enable the different line cards within the CMTS to speak to each other. In the video-on-demand example, this software would instruct the CMTS to tell the modem CM1 to switch its downstream channel to downstream B in order to receive the desired movie.

In accordance with the several embodiments of the present invention described in this application, the technique of the present invention may be used to synchronize a plurality of different access controllers which control a plurality of distinct ports at the Head End of an access network. In the context of a cable network, the technique of the present invention may be used to synchronize desired upstream and/or downstream channels across different line cards within a Cable Modem Termination System (CMTS). Moreover, the technique of the present invention offers a number of distinct advantages over conventional techniques used in the configuration or design of access networks.

For example, the technique of the present invention is particularly useful or advantageous in access networks implementing redundancy protocols. Referring to FIG. 3B, for example, a modification may be made whereby the upstream and downstream ports on each line card are connected to both optical node A 352*a* and optical node B 352*b*. In this modified embodiment, each of the cable modems in the network has access to the ports on both line card A and line card B. Initially, it may be assumed that line card A services the cable modems of Group A 360*a*, and line card B services the cable modems of Group B 360*b*. In accordance with the technique of the present invention, if a problem occurs on line card A, for example, the Group A modems are able to switch over to the line card B without these modems having to resynchronize themselves with the line card B time reference (since line card A is already synchronized with line card B). In conventional systems, however, the two line cards would not be synchronized. Thus, any modems switching from line card A to line card B are required to re-synchronize with line card B. This, in turn, introduces delays in the communication protocol between the cable modem and the CMTS. In certain applications, such as telephony, such delays are extremely undesirable since they directly effect the call quality of a voice call, for example.

In addition to providing benefits for redundancy protocols, the timestamp synchronization technique of the present invention provides for seamless downstream channel change at the cable modem end. This feature is described in greater detail in the provisional application referenced at the beginning of this application. Timestamp synchronization also provides benefits in facilitating multi-service convergence of voice, video, and high-speed data applications. These issues become increasingly important as streaming media and video streams are multiplexed onto the same data network.

Additionally, the technique of the present invention provides added flexibility in network implementation by allowing DOCSIS (or MAC) domains to be dynamically configurable via software. Further, each DOCSIS domain may be configured to cross line card boundaries. Thus, the technique of the present invention provides the advantage of allowing different upstream and/or downstream ports on different line cards to be grouped together within the same DOCSIS domain. This, in turn, provides the advantage of allowing greater flexibility in the design of line card interfaces. Furthermore, since different ports on different line card interfaces may be assigned to the same domain, the cable operator or service provider is allowed greater flexibility and scalability in configuring different domains to suit the needs specific applications such as, for example, telephony, video-on-demand, etc. Several of these advantages are illustrated by way of example in the description of FIG. 4.

Figure 4:
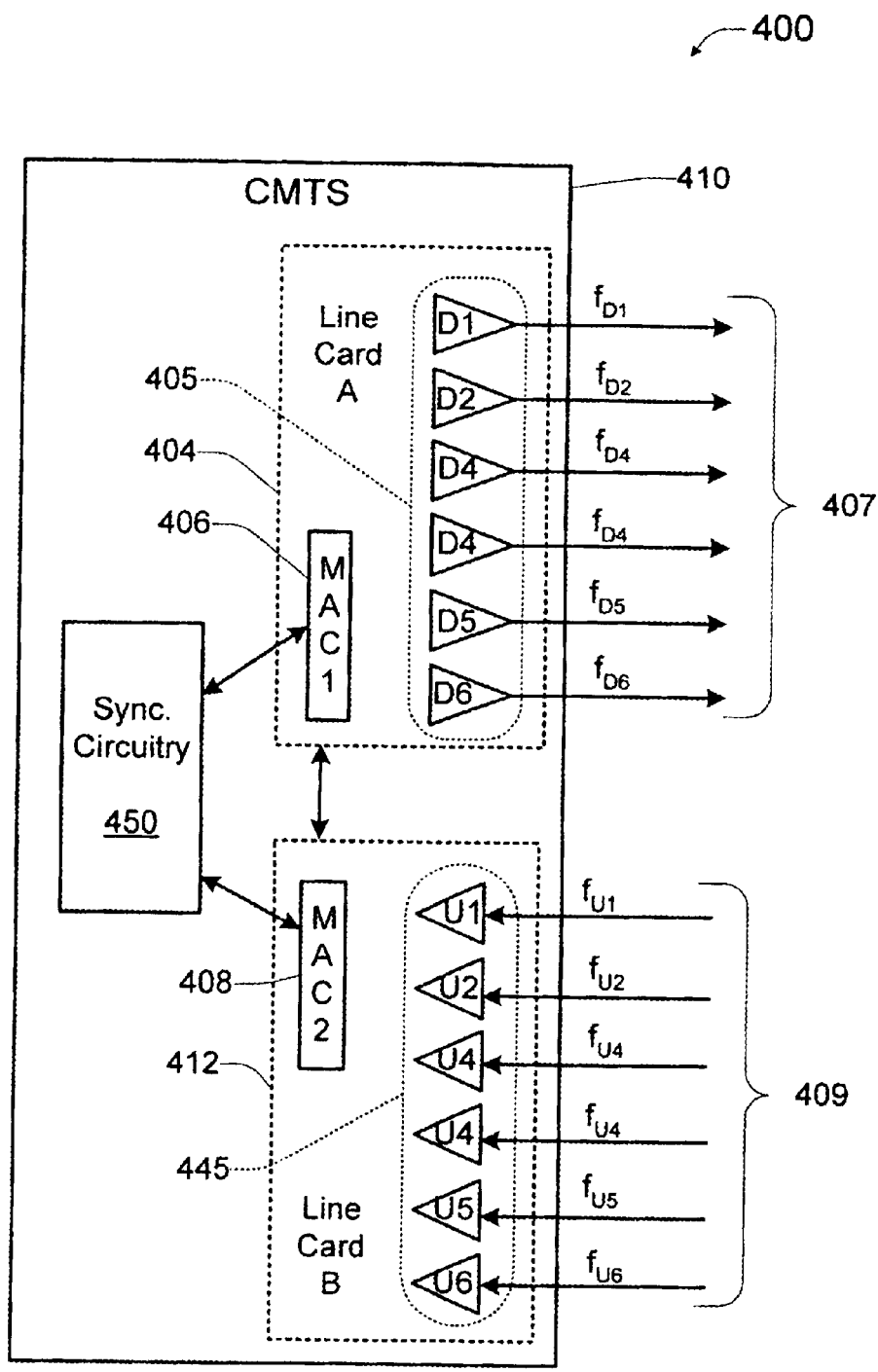
FIG. 4 shows a block diagram of a specific embodiment for implementing a Cable Modem Termination System (CMTS) 400 using the technique of the present invention.

FIG. 4 shows a block diagram of a specific embodiment of a Cable Modem Termination System (CMTS) 400 which may be implemented using the technique of the present invention. As shown in FIG. 4, separate upstream and downstream line cards may be provided within the CMTS, which offers greater flexibility and scalability to the cable operator or service provide when configuring particular domains in the network to be optimized for specific applications. Thus, as shown in FIG. 4, a first line card 404 includes a plurality of downstream channels 407 corresponding to of downstream transmitters 405, and a second line card 412 includes a plurality of upstream channels 409 corresponding to upstream receivers 445. By synchronizing each of the line cards in accordance with the technique of the present invention, it is then possible to dynamically assign (via software) a first group of upstream and downstream channels to a first domain, a second group of upstream and downstream channels to a second domain, and so on. In this way, the service provider is provided with tremendous flexibility in being able to group any combination of upstreams and/or downstream together within a single domain. As long as the MAP messages, timestamp synchronization messages, and upstream channel descriptors are distributed appropriately, any number of DOCSIS domains may be implemented, wherein each domain includes any desired combination of upstream and downstream channels available at the CMTS. This provides the cable operator or service provider tremendous flexibility when configuring a cable network or other access network to suit specific applications. For example, video-on-demand applications are downstream bandwidth intensive, and therefore the service provided may wish to configure a domain for this application which includes a large number of downstream channels and a relatively few number of upstream channels. However, for voice applications, the service provider may wish to configure the network differently. Since voice applications, such as telephony, for example, use approximately symmetrical bandwidth, it may be preferable to configure a CMTS (or one or more line cards within the CMTS) to include an appropriate ratio of upstream and downstream channels within each domain in order to provide each domain with symmetrical bandwidth."

The present invention provides total flexibility in allowing one to group together any combination of upstream and/or downstream ports across different line cards into a single domain. Additionally, the technique of the present invention provides the added benefit of allowing the user to dynamically modify the number of upstream and/or downstream channels within a particular domain by reassigning selected ports (on one or more different line cards) to different domains. Further, using the technique of the present invention, the cable operator is able to implement such modifications without having to install additional hardware (e.g., line cards) at the CMTS.

Figure 5:
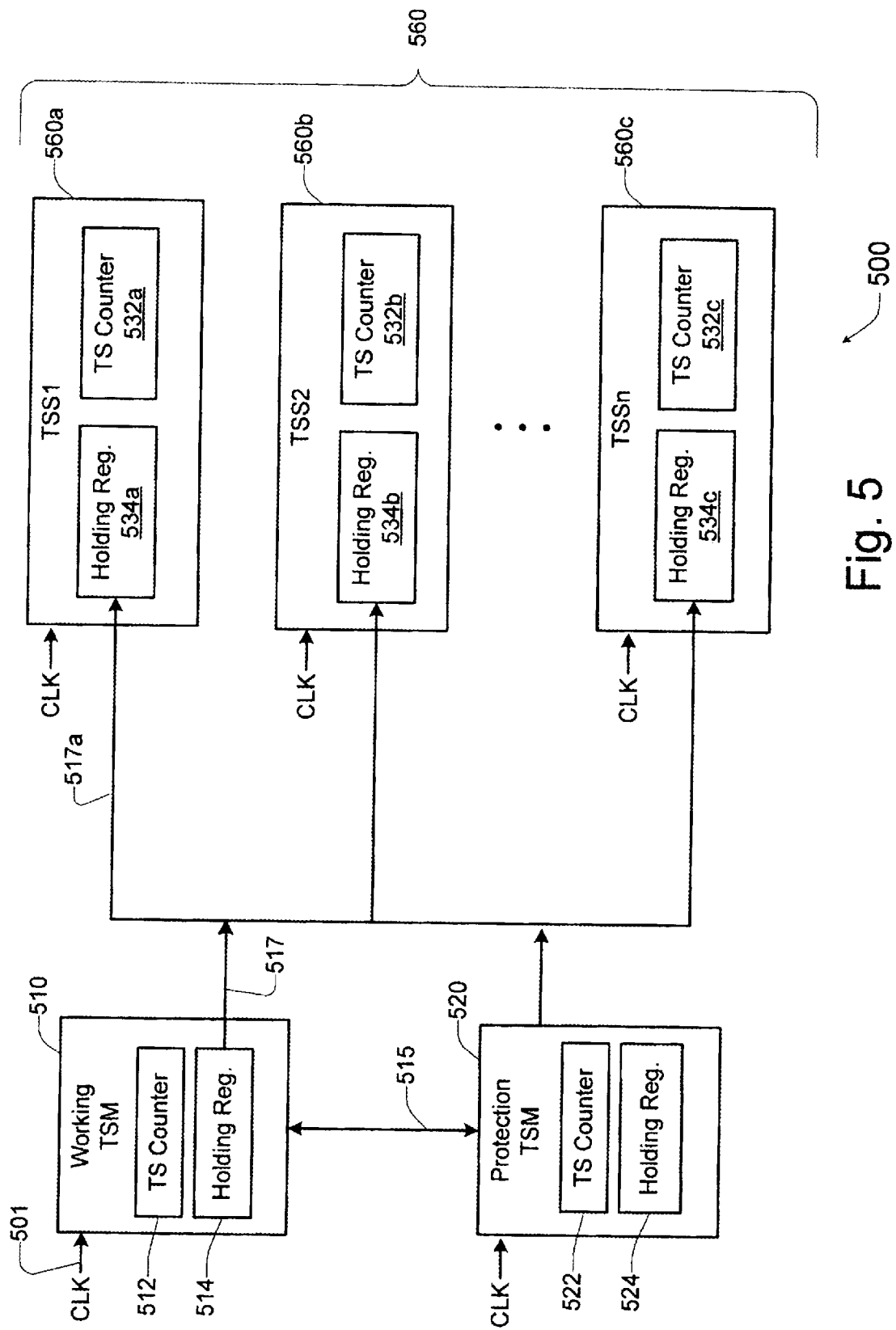
FIG. 5 shows a block diagram of a specific embodiment for synchronizing a plurality of Media Access Control (MAC) controllers using the technique of the present invention.

FIG. 5 shows a schematic block diagram of a specific embodiment of the present invention for synchronizing different MAC controllers across different line cards within a CMTS. In a specific embodiment, each line card includes a separate MAC controller. In an alternate embodiment, there may be multiple MAC controllers on a line card, and multiple line cards within the system. Each of the plurality of slave time reference devices 560 in FIG. 5 represents a separate MAC controller. All of the slave time reference devices are connected together across the backplane of the system and connected to a master time reference device 510. Further, in the embodiment of FIG. 5 each of the devices of system 500 are driven by a system clock (CLK).

In a specific embodiment, the system clock CLK is derived from a network source or other timing reference external to the network Head End. For example, the clock may be derived from a T1 line connected to the network Head End. Typically, the T1 clock has a frequency of 1.544 MHz. A phase lock loop (PLL) circuit may then be used to convert the T1 clock signal into a desired network clock frequency of 10.42 MHz. Alternatively, the system CLK may be derived from a Stratum clock source such as, for example, a GPS or SONET clock source.

In a specific embodiment, the master time reference device 510 is the time keeper for the entire system, and is referred to as the timestamp master (TSM). The timestamp master device 510 may reside on one of the line cards or on another device within the system. Its functions include maintaining and updating current time reference data, and periodically distributing synchronization signals (including the current time reference data) to the plurality of slave time reference devices 560 in the system. As shown in FIG. 5, the timestamp master 510 includes a master timestamp counter 512 which maintains the current timestamp data for the system. In a specific embodiment, the timestamp counter 512 is a 32-bit timestamp counter. However, it will appreciated by one skilled in the art that the timestamp counter may be configured to include any desired number of bits, depending upon the specific network configuration. Additionally, it will be appreciated that other timing devices or time reference devices may be used to implement the functions of the timestamp counter 512. Additionally, as shown in FIG. 5, the timestamp master device 510 also includes a holding register 514 or other data structure for storing current time reference data to be distributed to each of the slave time reference devices via synchronization line(s) 517. In a specific embodiment, the holding register is implemented using a 32-bit parallel-to-serial register.

In the specific embodiment of FIG. 5, each of the plurality slave time reference devices 560 is referred to as a timestamp slave (TSS) device. As explained in greater detail below, the plurality of TSS devices 560 are synchronized with each other using the synchronization signals provided by the timestamp master 510.

As shown in FIG. 5, each TSS device includes a respective slave timestamp counter 532. For example, slave device 560a includes a timestamp counter 532a. The function of the timestamp counter 532a is to maintain a local time reference for the slave time reference device 560a. In a specific embodiment, the timestamp counter 532a is a 32-bit timestamp counter. However, it will appreciated by one skilled in the art that the slave timestamp counter may be configured to include any desired number of bits. Additionally, as shown in FIG. 5, each slave time reference device includes a holding register 534 or other data structure for storing current time reference data received from the timestamp master device 510. In a specific embodiment, the holding register is implemented using a 32-bit serial-to-parallel register.

In order to improve overall system availability, it may also preferable to include a redundant or backup timestamp master device within the system. In the specific embodiment as shown in FIG. 5, a redundant timestamp master device 520 is provided which uses the same clock (CLK, 501) as the working timestamp master, and also is configured to receive and process the various timestamp master signals in a manner similar to that described above with respect to the timestamp slave devices, in order to stay in synchronization with the working TSM. In a specific embodiment, the backup timestamp master device 520 is preferably located on a different card or device within the system than working timestamp master device 510 in order to provide the system with hot swapability of different timestamp master devices. Additionally, a simple control interface may be provided between the working TSM and the redundant TSM to coordinate the redundant TSM taking over when the working TSM goes down.

By way of example, referring to the embodiment of FIG. 5, the working TSM 510 may periodically send an "OK" status signal to the redundant TSM 520 via line 515 in order to let the redundant TSM know that everything is functioning properly. When a failure is detected at the working TSM 510, the protection TSM 520 may immediately take over the duties of the working TSM buy providing synchronization signals (including current time reference data) to the TSS devices 560 in the system.

Additionally, it will be appreciated that even when the working TSM goes down, the plurality of TSS devices 560 in the system will continue to run in synchronization with each other, since each timestamp counter in each TSS device is configured to run continuously and independently of the timestamp master. Moreover, since each of the TSS devices is running off the same clock (CLK), once these devices are initially synchronized, they should continue to stay synchronized. However, it is possible for the slave timestamp counters to drift from their synchronized state (e.g. due to hardware failure). For this reason, the timestamp master periodically distributes current time reference data so that synchronization can be maintained between each of the TSS devices. Moreover, this periodic broadcast of current time reference data enables newly inserted line cards to synchronize themselves with the timestamp master shortly after insertion by using the data from the next time reference broadcast. In a specific embodiment, the TSM may send out synchronized timestamp messages at regular intervals, which may range, for example, from 10 microseconds to 1 millisecond.

Master/Slave Interfaces

The embodiment of FIG. 5 includes two interfaces, namely a master interface and a slave interface, which allow DOCSIS devices to pass timestamp synchronization information from a timestamp master device (TSM) 510 to multiple timestamp slave devices (TSSs) 560. A primary function of the master time reference device (TSM) 510 is to provide for the synchronization of multiple DOCSIS CMTS MAC controllers. The TSM may also be used at the system level to synchronize different line cards in order to provide 1:1 or 1:n redundancy. In a specific embodiment, all signals generated from the TSM interface are synchronized to the system clock (CLK 501). As shown in FIG. 5, the timestamp master device 510 provides synchronization data to each of the plurality of timestamp slave devices 560 via a plurality of synchronization lines 517. At least a portion of the plurality of synchronization lines 517 are described by the timestamp master and timestamp slave interfaces of Tables 1 and 2.

TABLE 1

Timestamp Master Interface

| Signal | Direction | Description |
|---|---|---|
| TSM_RST | Output | Resets the slave timestamp counter |
| TSM_DATA_VALID | Output | Active for 32 clocks when a new timestamp value is being shifted in |
| TSM_DATA | Output | Serial Data |
| TSM_LOAD_DATA | Output | Loads the new timestamp value into the slave timestamp counter |

Table 1 shows a protocol of a specific embodiment of the timestamp master interface associated with the timestamp master device 510. In this embodiment, the timestamp master device 510 is configured to have a plurality of output lines or ports. These output lines may be implemented, for example, as output pins on a customized chip or circuit. The output signals described in Table 1 are used to coordinate synchronization between the timestamp master device 510 and the plurality of timestamp slave devices 560. The timestamp master interface described in the embodiment of Table 1 includes a reset output line (TSM_RST), a data validation output line (TSM_DATA_VALID), a data output line (TSM_DATA), and a load data output line (TSM_LOAD_DATA).

As shown in FIG. 5, one or more synchronization lines 517 may be used to carry the plurality of synchronization signals from the timestamp master device 510 to the plurality of timestamp slave devices 560. Additionally, as shown in FIG. 5, the timestamp master 510 may include an additional interface 515 for communicating with the protection timestamp master device 520.

TABLE 2

Timestamp Slave Interface

| Signal | Direction | Description |
|---|---|---|
| TSS_RST | Input | Resets the timestamp counter |
| TSS_DATA_VALID | Input | Active for 32 clocks when a new timestamp value is being shifted in |
| TSS_DATA | Input | Serial Data |
| TSS_LOAD_DATA | Input | Loads the new timestamp value into the timestamp counter |

Table 2 shows a specific embodiment of a timestamp slave interface, which may be implemented at each of the timestamp slave devices within the system. Each timestamp slave interface includes a plurality of input lines for receiving synchronization signals generated by the timestamp master (TSM). Each of the timestamp slave interface input signals corresponds with a respective one of the timestamp master interface output signals. For example, as shown in Table 2, the timestamp slave interface includes a reset input line (TSS_RST), a data validation input line (TSS_DATA_VALID), a data input line (TSS_DATA), and a load data input line (TSS_LOAD_DATA).

The timestamp slave interface allows a MAC controller timestamp counter to be clocked, loaded and reset from an external timestamp master. In a specific embodiment, when a current timestamp value is loaded into the holding register within a timestamp slave device, hardware and/or software will compare the value loaded into the holding register 534 with the current timestamp count value of the timestamp counter 532. If the difference of these two values is more than a predetermined amount (e.g. 1–5 clocks or counter units), an interrupt signal or other error signal will be generated in order to alert the other devices in the system and/or a system technician of the error.

Figure 6:
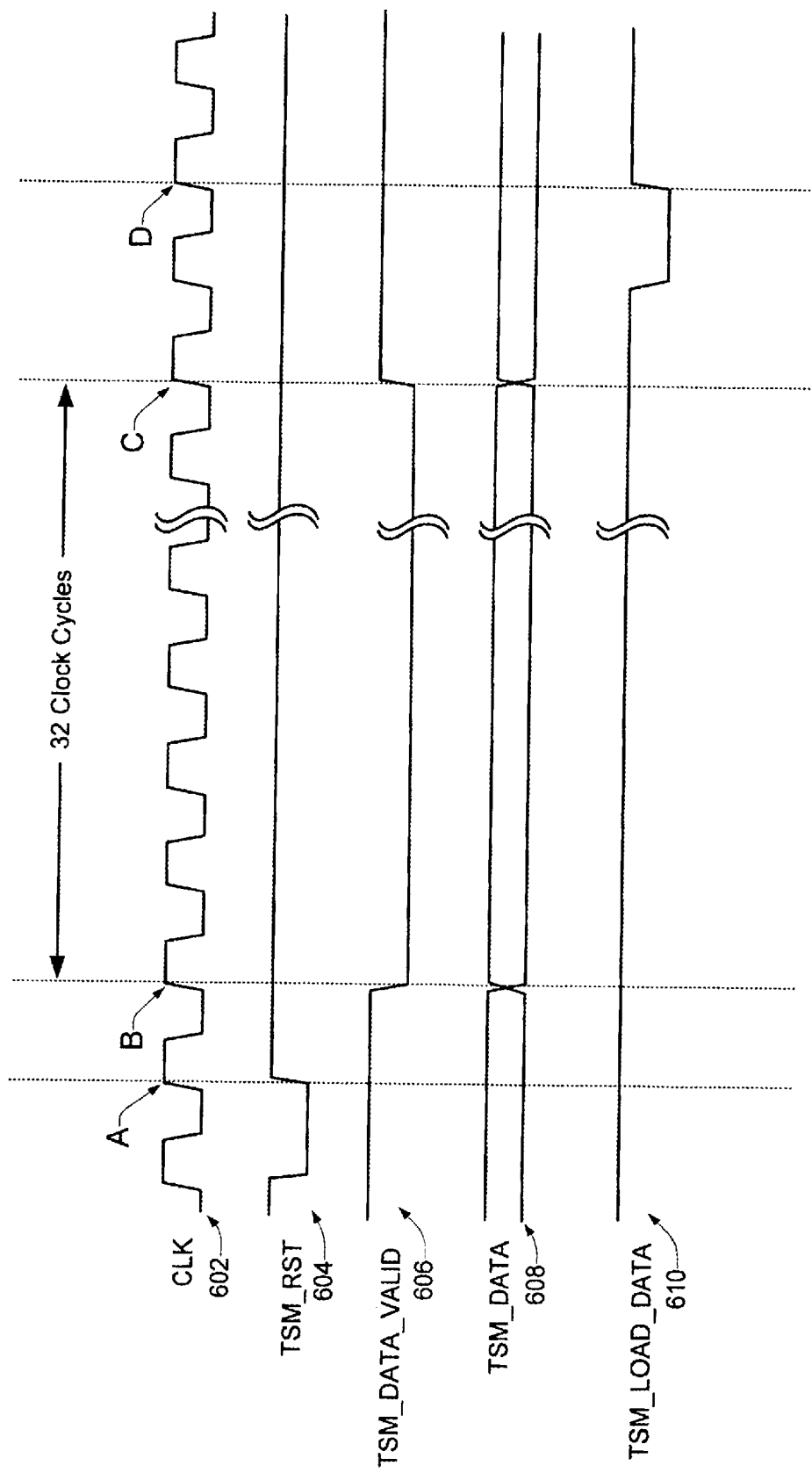
FIG. 6 shows a timing diagram which illustrates the timing relationship between various signals used achieve synchronization of different MAC controllers in accordance with a specific embodiment of the present invention.

The timing protocol for asserting various synchronization signals in order to achieve synchronization between the TSM and TSS devices is shown, for example, in FIG. 6 of the drawings. FIG. 6 shows a timing diagram which illustrates the timing relationship between various synchronization signals generated by the timestamp master device 510, and used to achieve synchronization of the plurality of timestamp slave devices 560 in accordance with a specific embodiment of the present invention.

"In the specific embodiment of FIG. 6, it is assumed that each of the synchronization signals generated by the timestamp master device are received at each of the timestamp slave devices at exactly the same time, as represented by CLK signal 602. At A, the TSM_RST signal 604 is asserted to thereby cause each of the timestamp slave devices to reset its respective holding register 534 and timestamp counter 532. In a specific embodiment, software may be used to control the TSM_RST signal via a PCI mapped register, for example. In general, the TSM_RST signal may be asserted at any time except for when a load sequence is in progress (e.g., TSM_DATA_VALID signal is asserted)."

After each of the timestamp slave holding registers and slave counters have been reset, at B, the TSM_DATA_VALID signal 606 is asserted at each of the timestamp slave devices. At the same time, while the TSM_DATA_VALID signal is asserted, the TSM 510 begins transmitting current timestamp data to each of the plurality of timestamp slave devices via the TSM_DATA line 608. In a specific embodiment, the current timestamp data is serially shifted out of the master holding register 514 and into the each slave holding register 534 of the timestamp slave devices. Since the Timestamp Counter is constantly changing, the master should preferably sample the timestamp counter 512 and hold this sampled value in holding register 514 for the duration of the 32 clock transfer to the slave. The sample should preferably be equal to the value of the timestamp counter 512 coincident with the clock edge on which TSM_DATA_VALID is asserted. In an alternate embodiment (not shown) parallel timestamp data may be provided by the TSM to each of the TSS devices.

When a timestamp slave device receives the asserted TSM_DATA_VALID signal, it begins to load into its holding register the serial data received on the TSM_DATA line. In a specific embodiment, the TSM_DATA is serially shifted into the holding register at a rate of 1 bit per clock cycle. The TSM_DATA_VALID signal 606 will remain asserted until all the bits of the current timestamp value have been serially transferred out of the master holding register 514. In the specific embodiment of FIG. 6, it is assumed that the length of the current timestamp value is 32 bits. Therefore, the TSM_DATA_VALID signal 606 will remain asserted for 32 clock cycles until each of the 32 bits of serial timestamp data has been loaded into the plurality of timestamp slave holding registers.

In a specific embodiment, the timestamp slave devices will load data into their respective holding registers only while the TSM_DATA_VALID signal 606 is asserted. At C, the TSM_DATA_VALID signal is deasserted, thereby indicating that all bits of the current master timestamp value have been transmitted by the TSM. The deassertion of the TSM_DATA_VALID signal 606 prevents any further data from being shifted or loaded into any of the timestamp slave holding registers. At D, the TSM asserts the TSM_LOAD_DATA signal 610, which is simultaneously received by all timestamp slave devices. When the TSM_LOAD_DATA is received by a timestamp slave device, it transfers the contents of its holding register 534 into its timestamp counter 532. In this way, precise synchronization between each of the timestamp slave devices is obtained since the same timestamp value is simultaneously loaded into each respective timestamp counter of each timestamp slave device.

The timestamp load function can be divided into two distinct operations. The first operation loads a new timestamp value into the holding register of each slave device, and the second operation transfers the contents of this register into the respective timestamp counter of that slave device. In the specific embodiment shown in FIGS. 5 and 6, this second operation of the load function is achieved through the use of a LOAD_DATA signal. Thus, in this embodiment, a load is achieved by asserting the TSM_DATA_VALID signal for 32 clocks, and then by asserting the TSM_LOAD_DATA signal for one clock following the deassertion of the TSM_DATA_VALID signal. It should be noted that there is no requirement for there to be any delay between the deassertion of the TSM_DATA_VALID signal and the assertion of the TSM_LOAD_DATA signal. The TSM_LOAD_DATA signal may be asserted on the same clock on which the TSM_DATA_VALID signal is deasserted. However, it is preferable that the two signals not be asserted at the same time.

In an alternate embodiment (not shown) the transferring of the contents of the holding register into the timestamp counter may be implemented automatically, either immediately or a fixed length of time after the deassertion of the TSM_DATA_VALID signal. In this latter embodiment, the timestamp master interface need not include a TSM_LOAD_DATA output line, and the timestamp slave interface need not include a TSS_LOAD_DATA input line. In a specific embodiment, the actual load of each slave timestamp counter occurs on the first rising edge of the CLK following the deassertion of the TSM_DATA_VALID signal. Thus, as shown for example in FIG. 6, each of the plurality of timestamp slave devices may be configured to automatically load the current time reference data from its respective holding register into its respective timestamp counter at D.

It will be appreciated that, since it takes 32 clocks to transfer the current timestamp value, the value received at the slave lags the actual timestamp value at the master timestamp counter 512. In order to compensate for this discrepancy the slave interface adds, for example, 34 to the received timestamp value and loads the sum into its internal timestamp counter 532. In this example, the added value of 34 is derived by adding together the 1 clock taken by the timestamp master to sample the current timestamp value into holding register 514, the 32 clocks taken to serially transfer the current timestamp value from the timestamp master to the timestamp slaves, and the 1 clock taken by the each timestamp slave to load the current timestamp value from its holding register 534 into its timestamp counter 532.

Since a line card can be hot-inserted into a system at any time, it may be possible for the line card to be installed while the TSM_DATA_VALID signal is asserted. Furthermore, it might be possible for the line card to be inserted while the TSM_LOAD_DATA signal is asserted or after the TSM_DATA_VALID is deasserted but before the TSM_LOAD_DATA signal has been asserted. Any of these cases indicate that a timestamp load sequence is in progress. In any of these situations, it is preferable that the timestamp slave device be configured to ignore the current load sequence and wait for the next one. For example, a timestamp slave device may be configured upon initialization to wait until a TSM_DATA_VALID signal has been deasserted for a predetermined number of clock cycles (e.g., 5–100 clocks) before it loads any timestamp data into its holding register. Additionally, the timestamp slave device may also be configured to ignore all assertions of the TSM_LOAD_DATA signal until its internal holding register has been successfully loaded. It will be appreciated that a load sequence may be initiated by software and/or hardware. For example, software may be used to causes a load sequence when it is desired to write a specific timestamp value into the master timestamp counter. Additionally, software and/or hardware may initiate a load sequence periodically in order to "broadcast" a current timestamp value to each of the timestamp slave devices. Software may also be used to program the interval between these broadcasts.

Alternate Embodiments

Figure 7A:
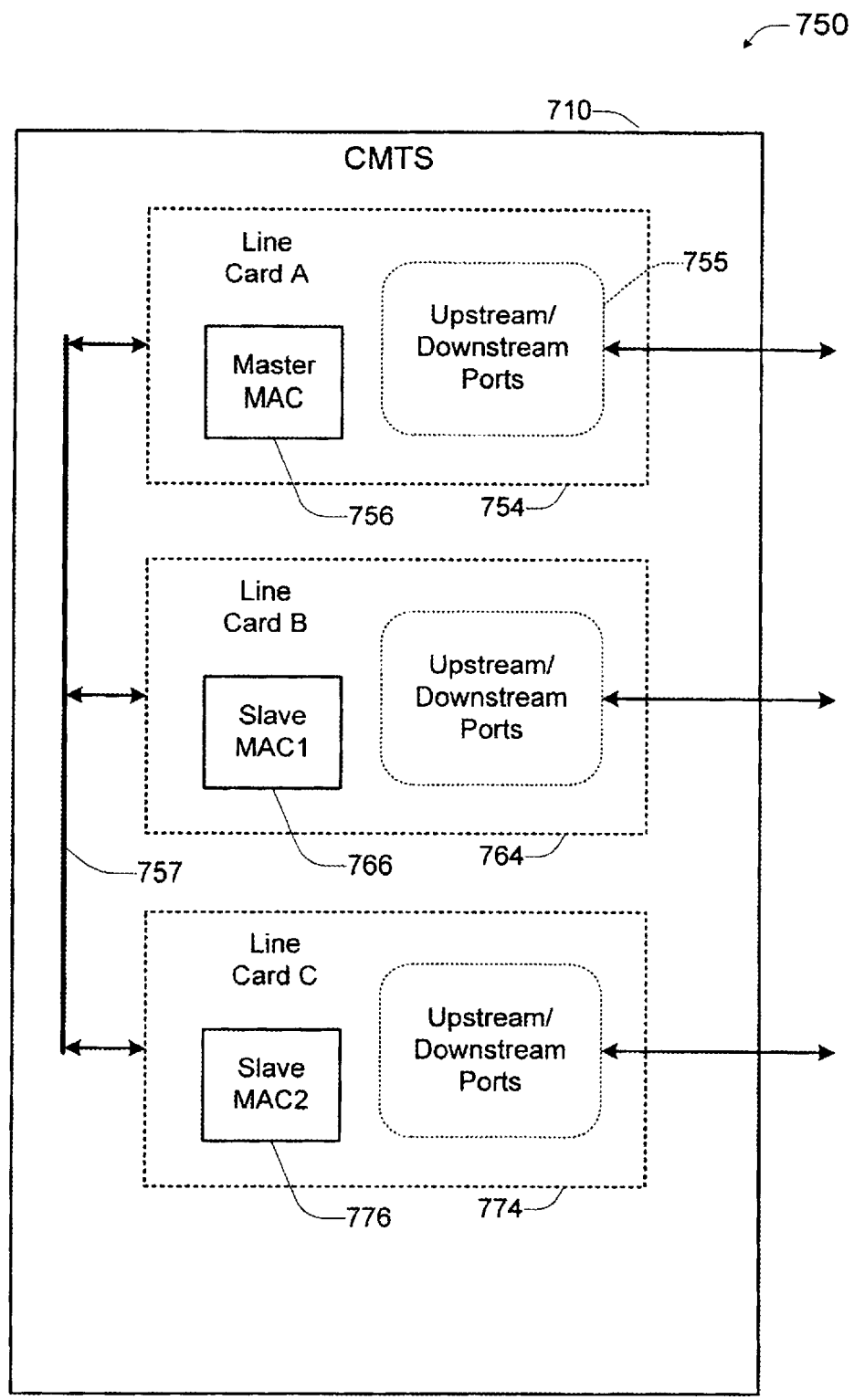
FIG. 7A shows a block diagram of an alternate embodiment for implementing the technique of the present invention within a CMTS.

FIG. 7A shows a block diagram of an alternate embodiment for implementing the synchronization technique of the present invention within a CMTS 750. In the embodiment of FIG. 7A, synchronization between the various MAC controllers within the CMTS is achieved by configuring or designating one of the MAC controllers to be a master MAC controller, and the other MAC controllers in the system to be slave MAC controllers. The master MAC controller then controls synchronization in a manner similar to the technique described, for example, in FIG. 6 of the drawings.

As shown in FIG. 7A, the CMTS 710 includes a plurality of physically distinct line cards 754, 764, 774. Each of the line cards includes a plurality of upstream and/or downstream ports, and further includes at least one MAC controller. A specific MAC controller (e.g. 756) on a specific line card (e.g. 754) is designated as the master MAC controller, and the remaining MAC controllers (e.g. 766, 776) within the CMTS are designated as slave MAC controllers. The master MAC controller includes a master time reference device which performs functions similar to the master time reference device described in FIG. 3 of the drawings. For example, the master time reference device is responsible for maintaining and updating current time reference data. This current time reference data, along with other synchronization signals, are periodically provided to the slave MAC controllers for causing the slave MAC controllers to be synchronized with the master MAC controller.

In a specific embodiment, one of the slave MAC controllers of FIG. 7A may be configured as a backup master MAC controller which is able to take over the functions of the master MAC controller 756 in the event that a failure is detected at the master MAC controller. Communication between the master MAC controller and the plurality of slave MAC controllers may be achieved through the use of signal lines, data lines, busses, or any combination thereof For example, in a specific embodiment, a plurality of synchronization lines may be used to coordinate synchronization between the master MAC controller and slave MAC controllers. Additionally, a separate status line or a bus may be used to communicate operating status information between the master MAC controller and any backup master MAC controllers within the CMTS.

Figure 7B:
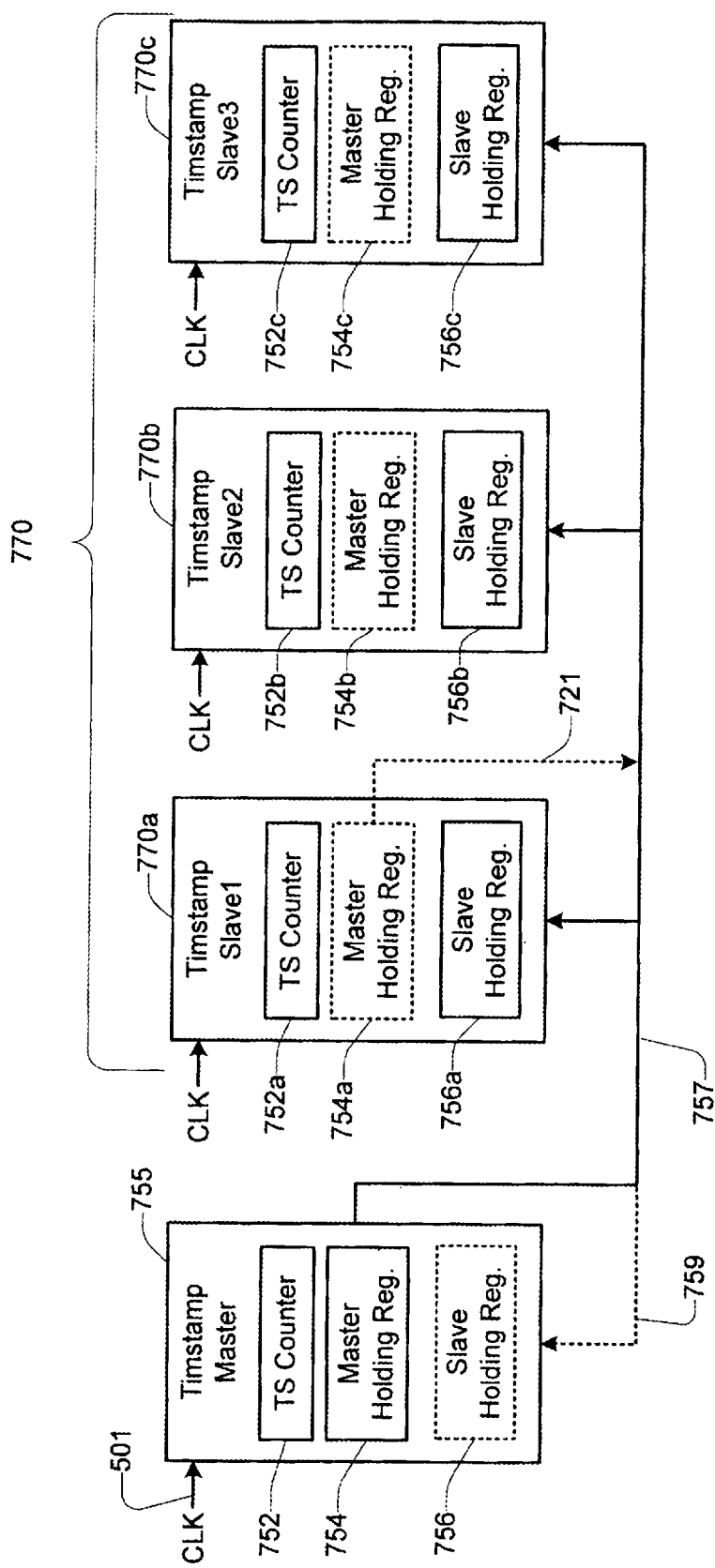
FIG. 7B shows a block diagram of a specific embodiment for synchronizing a plurality of Media Access Control (MAC) controllers in accordance with the embodiment of FIG. 7A.

A specific embodiment of the system 750 of FIG. 7A is shown in FIG. 7B of the drawings. In the embodiment of FIG. 7B, the designated master MAC controller includes a master time reference device 755, referred to as a timestamp master. Each of the plurality of slave MAC controllers includes a respective slave time reference 41 device, referred to as a timestamp slave. In a specific embodiment, the timestamp master and timestamp slave devices each include similar hardware in order to allow any one of the devices to be configured as the master, and the remainder of the devices to be configured as slaves. For example, the timestamp master device 755 and timestamp slave devices 770a–c each include a timestamp counter 752, a master holding register 754, and a slave holding register 756. When a MAC controller is configured as a timestamp master, its timestamp counter 752 functions as the master time reference device which maintains and updates a current time reference and periodically provides current timestamp data to the plurality of timestamp slave devices 770 so that the slave devices may synchronize themselves with the master device.

Each timestamp device in the system of FIG. 7B also includes a master timestamp interface (described, for example, in Table 1) and a slave timestamp interface (described, for example, in Table 2). When configured as timestamp master (i.e., 755), the slave input interface (759) and slave holding register 756 of the MAC controller are disabled. When configured as a slave timestamp device, (e.g., 770a) the master output interface 721 and master holding register 754a of that MAC controller are disabled.

When it is desired to provide the plurality of slave timestamp devices 770 with updated timestamp data from the timestamp master 755, the value from the master timestamp counter 752 is loaded into master holding register 754, where it is then serially output on line 757 to each of the slave holding registers (756a–c). In a specific embodiment, line 757 includes a plurality of synchronization lines such as those described previously, with respect to FIGS. 5 and 6 of the drawings. Further, the manner by which each timestamp slave utilizes the various synchronization signals and data provided by the timestamp master is similar to the techniques described above with respect to FIGS. 5 and 6 of the drawings.

Additionally, lines 757 may also include one or more status lines which communicate the operating status of the timestamp master to one or more of the timestamp slave devices 770. In a specific embodiment, one of the timestamp slave devices (e.g., 770a) may be configured to serve as a backup timestamp master device. In this embodiment, the timestamp Slave1 device 770a continuously monitors the operating status of the timestamp master via signal line 757. When a failure is detected at the timestamp master, device 770a may be automatically re-configured to function as the new timestamp master, and may continue to function as the timestamp master while a failure is detected at timestamp master 755. Since each of the timestamp counters in each of the MAC controllers is designed to function independently, each timestamp slave device should continue to function normally until the backup timestamp master begins to broadcast current timestamp data. Accordingly, network users should not experience any disruption in service during the changeover from timestamp master device 755 to backup master device 770a.

Using FIG. 7B to illustrate this redundancy technique, it is assumed in this example that each of the timestamp devices of FIG. 7B is located on a separate line card. When the line card associated with timestamp master device 755 is removed from the system, the timestamp device 770a may be configured to automatically assume the duties of the timestamp master until the timestamp master line card is placed back into the system. In this situation, additional hardware and/or software may be provided to configure device 770a as the timestamp master. This includes enabling the master holding register 754a and master timestamp interface 721, and disabling the slave holding register 756a and slave interface of timestamp device 770a. When the line card containing the timestamp master 755 is inserted back into the system, timestamp device 770a may automatically be reconfigured as a timestamp slave device upon determining that the timestamp master is up and running. Alternatively, timestamp device 770a may continue to function as the timestamp master, while timestamp device 755 may be configured to function as a timestamp slave device.

It will be appreciated by one having ordinary skills in the art that other synchronization aspects pertaining to the systems described in this application should preferably be accounted for in order to achieve full system synchronization. Such synchronization aspects are commonly known to those skilled in the art, and include, for example, line delays, clock skew between line cards, etc.

CMTS Configurations

Generally, the techniques of the present invention may be implemented on software and/or hardware. For example, they can be implemented in an operating system kernel, in a separate user process, in a library package bound into network applications, on a specially constructed machine, or on a network interface card. In a specific embodiment of this invention, the methods of the present invention are implemented in software such as an operating system or in an application running on an operating system.

A software or software/hardware hybrid system of this invention is preferably implemented on a general-purpose programmable machine selectively activated or reconfigured by a computer program stored in memory. Such a programmable machine may be a network device designed to handle network traffic. Such network devices typically have multiple network interfaces. One important class of device that may be used to implement the present invention is the Cable Modem Termination System. Preferably, the CMTS is a "routing" CMTS, which handles at least some routing functions. Alternatively, the CMTS may be a "bridging". CMTS, which handles only lower-level tasks.

Figure 8:
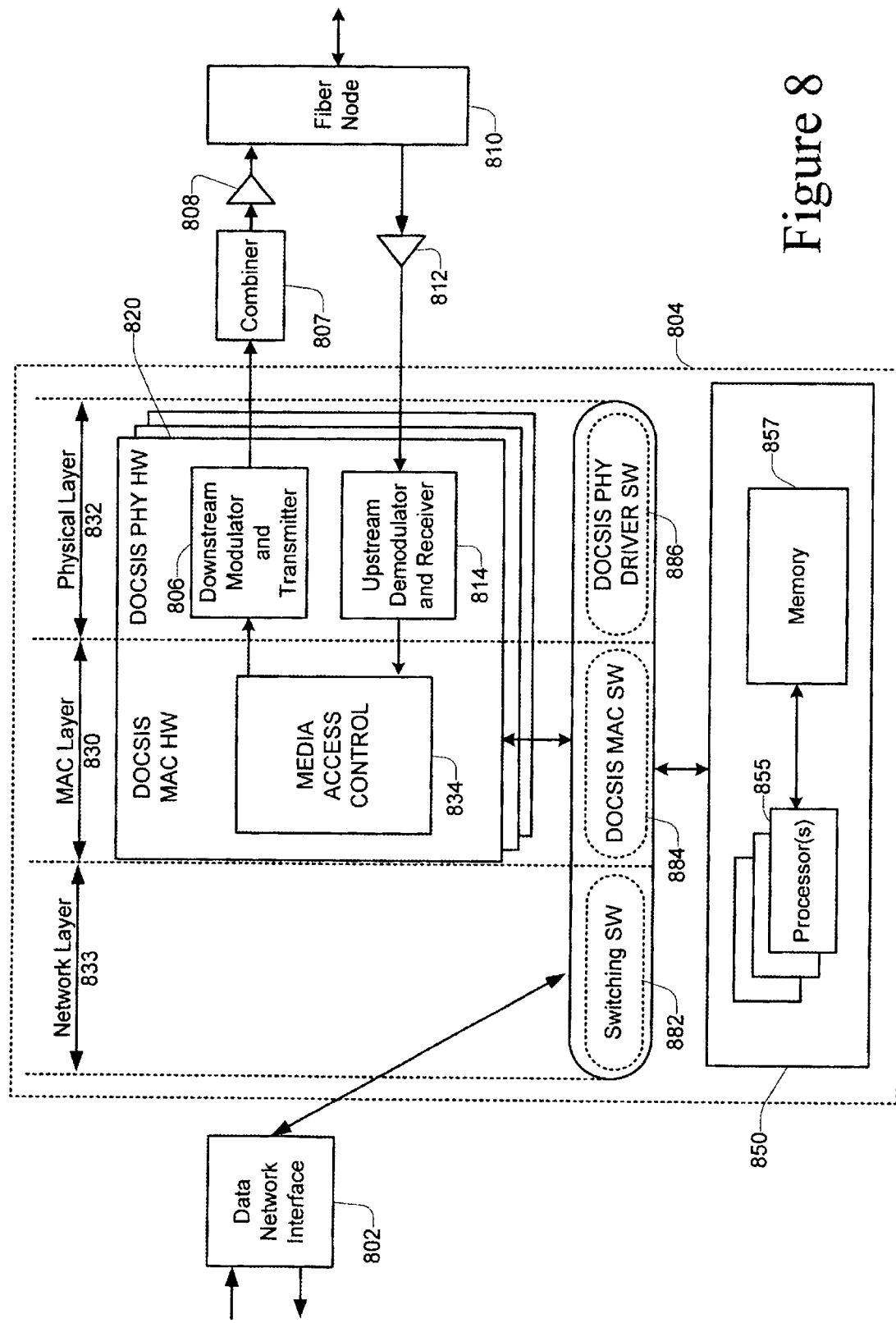
FIG. 8 shows a block diagram of a Cable Modem Termination System (CMTS) which may be used for implementing the technique of the present invention.

"FIG. 8 provides an example of some components of a CMTS that may be used to implement certain aspects of this invention. In the specific embodiment as shown in FIG. 8, a CMTS 804 provides functions on three network layers including a physical layer 832, a Media Access Control (MAC) layer 830, and a network layer 833. Generally, the physical layer is responsible for receiving and transmitting RF signals on the cable plant. Hardware portions of the physical layer include a downstream modulator and transmitter 806 and an upstream demodulator and receiver 814. The physical layer also includes software 886 for driving the hardware components of the physical layer.

Upstream optical data signals (packets) arriving via an optical fiber node 810 are converted to electrical signals by a receiver 812. Next, the upstream information packet (RF electrical signals) is demodulated by the demodulator/receiver 814 and then passed to MAC layer block 830. A primary purpose of MAC layer 830 is to encapsulate, with MAC headers, downstream packets and decapsulate, of MAC headers, upstream packets. In one embodiment, the encapsulation and decapsulation proceed as dictated by the above-mentioned DOCSIS standard for transmission of data or other information. The MAC headers include addresses to specific modems or to the CMTS (if sent upstream) by a MAC layer block 830 in CMTS 804. Note that the cable modems also include MAC addressing components. In the cable modems, these components encapsulate upstream data with a header containing the MAC address of the CMTS.

MAC layer block 830 includes a MAC hardware portion (e.g. MAC controller) 834 and a MAC software portion 884, which together serve the above-described functions. In a preferred embodiment, MAC hardware portion 834 is distinct from the router's general-purpose microprocessor and is dedicated to performing some MAC layer functions. In specific CMTS configurations, the hardware portions of the physical layer 832 and MAC layer 830 reside on a physical line card 820 within the CMTS. The CMTS may include a plurality of distinct line cards which service particular cable modems in the network. Each line card may be configured to have its own unique hardware portions of the physical layer 832 and MAC layer 830.

After MAC layer block 830 has processed the upstream information, it is then passed to network layer block 833. Network layer block 833 includes switching software 882 for causing the upstream information packet to be switched to an appropriate data network interface on data network interface 802. When a packet is received at the data network interface 802 from an external source, the switching software within network layer 832 passes the packet to MAC layer 830. MAC block 804 then transmits information via a one-way communication medium to downstream modulator and transmitter 806. Downstream modulator and transmitter 806 takes the data (or other information) in a packet structure and converts it to modulated downstream frames, such as MPEG or ATM frames, on the downstream carrier using, for example, QAM 64 modulation (other methods of modulation can be used such as CDMA (Code Division Multiple Access) OFDM (Orthogonal Frequency Division Multiplexing), FSK (FREQ Shift Keying)). The return data is likewise modulated using, for example, QAM 16 or QSPK. Data from other services (e.g. television) is added at a combiner 807. An optical converter 808 converts the modulated RF electrical signals to optical signals that can be received and transmitted via Fiber Node 810 to the cable modem hub.

Note that alternate embodiments of the CMTS (not shown) may not include network layer 833. In such embodiments, a CMTS device may include only a physical layer and a MAC layer, which are responsible for modifying a packet according to the appropriate standard for transmission of information over a cable modem network. The network layer 833 of these alternate embodiments of CMTS devices may be included, for example, as part of a conventional router for a packet switched network. In a specific embodiment, the network layer of the CMTS is configured as a cable line card coupled to a standard router that includes the physical layer block 832 and MAC layer block 830. Using this type of configuration, the CMTS is able to send and/or receive IP packets to and from the data network interface 802 using switching software block 882.

The data network interface 802 is an interface component between external data sources and the cable system. The external data sources transmit data to the data network interface 802 via, for example, optical fiber, microwave link, satellite link, or through various media. The data network interface includes hardware and software for interfacing to various networks such as, for example, Ethernet, ATM, frame relay, etc.

As shown in FIG. 8, CMTS 804 includes a central hardware block 850 including one or more processors 855 and memory 857. These hardware components interact with software and other hardware portions of the various layers within the CMTS. They provide general purpose computing power for much of the software. Memory 857 may include, for example, I/O memory (e.g. buffers), program memory, shared memory, etc. The data structures described in this application may reside in such memory. Hardware block 850 may physically reside with the other CMTS components. In one embodiment, the software entities 882, 884, and 886 are implemented as part of a network operating system running on hardware 850. Preferably, at least a part of the timestamp synchronization functions of this invention are implemented in software as part of the operating system. In FIG. 8, such software may be part of MAC layer software 884 and/or the switching software 882, or may be closely associated therewith. Of course, the timestamp synchronization logic could reside in hardware, software, or some combination of the two.

The procedures employed by the CMTS during registration and pre-registration are preferably performed at the MAC layer of the CMTS logic. Thus, in CMTS 804, most of the registration operations would be performed by the hardware and software provided for MAC layer logic 830.

The operations associated with obtaining an IP address for cable modems are preferably implemented at the network layer level 833. As noted, this may involve the CMTS communicating with a DHCP server via data network interface 802, for example."

The timestamp synchronization techniques of this present invention may be implemented on various general purpose Cable Modem Termination Systems. In a specific embodiment, the systems of this invention may be specially configured CMTSs such as, for example, specially configured models in the uBR-7200 series of CMTSs available from Cisco Systems, Inc. of San Jose, Calif. In an alternative embodiment, the methods of this invention may be implemented on a general-purpose network host machine such as a personal computer or workstation. Further, the invention may be at least partially implemented on a card (e.g., an interface card) for a network device or a general-purpose computing device.

Although the system shown in FIG. 8 represents one specific CMTS architecture of the present invention, it is by no means the only CMTS architecture on which the present invention can be implemented. For example, other types of interfaces and media could also be used with the CMTS.

Regardless of network device's configuration (for cable plants or otherwise), it may employ one or more memories or memory modules (e.g., memory 857) configured to store program instructions for the network operations and other functions of the present invention described herein. The program instructions may specify an operating system and one or more applications, for example. Such memory or memories may also be configured to store data structures or other specific non-program information described herein.

Because such information and program instructions may be employed to implement the systems/methods described herein, the present invention relates to machine-readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). The invention may also be embodied in a carrier wave travelling over an appropriate medium such as airwaves, optical lines, electric lines, etc. Examples of program instructions include both machine code, such as produced by a compiler, and files containing higher level code that may be executed by the computer using an interpreter.

It will be appreciated by one having ordinary skill in the art that the technique of the present invention may be implemented in any computer network having a standardized protocol for utilizing a central termination system (e.g. Head End) to schedule time slots for remote stations or nodes on a return (or upstream) channel. In wireless networks, the central termination system may be referred to as a Head End or wireless base station. In satellite networks, the central termination system may be referred to as a master controlling station.

OTHER EMBODIMENTS

While the discussion to this point has focused on timestamp synchronization techniques for cable networks, the technology of the present invention may be applied to any access or shared-access network having a plurality of hosts or nodes which share at least one channel for communicating with at least one "head-end" in the network. Examples of shared-access networks include, in addition to cable networks, wireless networks, Ethernet, FastEthernet, GigabitEthernet, LANs, etc. In the cable network, the plurality of nodes represents a plurality of cable modems that communicate with at least one CMTS at the centralized termination system using at least one shared-access upstream and downstream channel.

In general, the methods and apparatus described above may be implemented on a traffic handling device (e.g., a router) for providing timestamp synchronization in a network having at least one traffic handling device (e.g., another router) that provides normal service to a host. In the wireless system (e.g., represented by FIG. 9) the plurality of nodes or hosts corresponds to the plurality of wireless nodes 950 which use at least one shared access channel to communicate with at least one access control system 922 located at the Head End of the wireless system.

Figure 9:
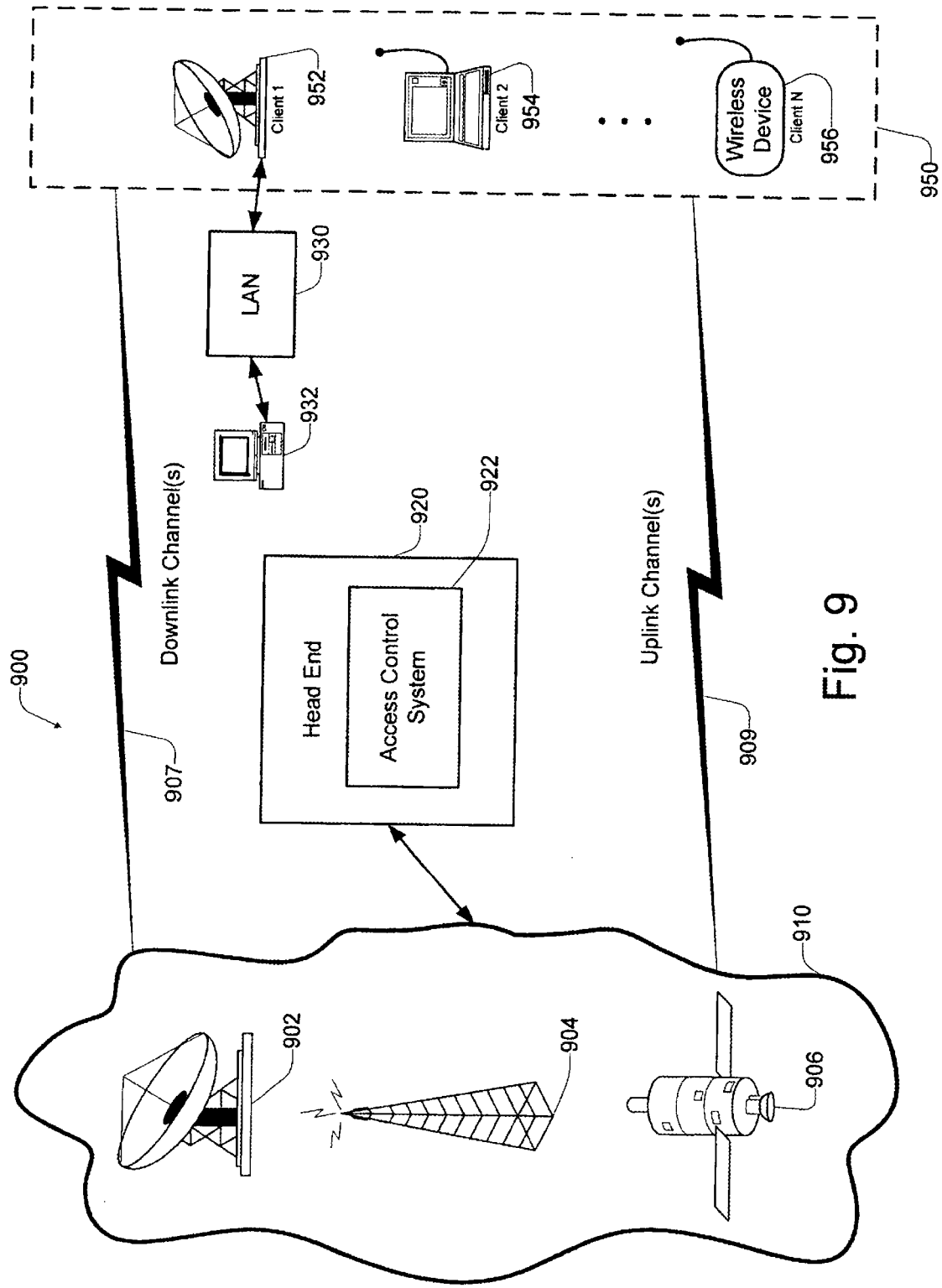
FIG. 9 shows a block diagram of wireless network which may be used for implementing the technique of the present invention.

As shown in FIG. 9, the wireless system includes a central termination system (or Head End) 920. The Head End includes an access controller or access control system (ACS) 922 which communicates with a plurality of wireless nodes 950, and coordinates access between each of the wireless nodes and the Head End 920. The access controller 922 may include memory and at least one processor. In a specific embodiment, the function of the access controller 922 is analogous to that of the CMTS described above with respect to cable modem networks. It may serve as a router as well.

The Head End 920 communicates with a plurality of wireless nodes 950 via any one of a plurality of wireless transmitting and receiving devices 910. As shown in FIG. 9, for example, the plurality of wireless transmitting and receiving devices 910 may include satellite base stations 902, orbital satellites 906, radio towers 904, etc.

In a specific embodiment which is analogous to that of cable modem networks, the Head End 920 of the wireless computer system communicates with the plurality of nodes 950 via one or more downlink channels 907 and one or more uplink channels 909. Each downlink channel 907 is a broadcast-type channel utilized by the Head End to communicate with an associated group of wireless nodes within the wireless network. The uplink channel 909 is a shared-access channel, which is utilized by a group of wireless nodes (analogous to cable modems) to communicate with the Head End 920. The access controller 922 stores registration parameters for the various nodes that it services. It may also store the IP addresses for nodes that it services.

In a specific embodiment of the present invention, the registration process and information is similar to that of the cable network CMTSs described above. Moreover, the technique of the present invention for timestamp synchronization over a shared access data network may be implemented in wireless system 900.

The wireless devices or nodes 950 may include any one of a number of wireless transmitting/receiving devices. For example, a satellite dish 952 may be used to communicate with the Head End 920 via the uplink and downlink channels. The satellite dish may, in turn, be connected to a local area network (LAN) 930 which, may be further connected to one or more computer systems 932. Another wireless device may be a portable/wireless computer system 954, which is able to transmit and receive information to the Head End via uplink and downlink channels 907 and 909. Other wireless devices 956 may include, for example, wireless telephones, handheld computing devices, etc.

In specific embodiments where the uplink and downlink channels within the wireless system 900 are utilized in a manner similar to that of the upstream and downstream channels of a cable modem network, the above-described timestamp synchronization techniques may easily be implemented in wireless system 900 using the detailed description of the present invention provided herein. Moreover, the technique of the present invention may be easily implemented in any computer network which uses shared access channels for communicating between a centralized computing system and one or more remote nodes.

Although several preferred embodiments of this invention have been described in detail herein with reference to the accompanying drawings, it is to be understood that the invention is not limited to these precise embodiments, and at various changes and modifications may be effected therein by one skilled in the art without departing from the scope of spirit of the invention as defined in the appended claims.

What is claimed is:

1. A method for synchronizing time reference devices in an access network, the access network comprising a Head End and a plurality of nodes, the Head End including an access control system having a plurality of media access controllers, each media access controller controlling a respective interface to the access network, the plurality of media access controllers including a first distinct access controller for controlling a first interface, said first access controller including a first time reference device, said first interface including a first distinct plurality of ports for communicating with at least a first portion of the plurality of nodes, the plurality of access controllers further including a second distinct access controller for controlling a second interface, said second access controller including a second time reference device, said second interface including a second distinct plurality of ports for communicating with at least a second portion of the plurality of nodes, wherein the first access controller and the first interface reside on a first physical line card within the access control system, wherein the second access controller and the second interface reside on a second physical line card within the access control system, wherein the first plurality of ports includes a first downstream channel transmitter and at least one first upstream channel receiver, and wherein the second plurality of ports includes a second downstream channel transmitter and at least one second upstream channel receiver, the method comprising:

providing at least one synchronization signal to said first and second access controllers;

utilizing, at said first and second access controllers, said at least one synchronization signal in a manner which results in the first and second time reference devices being in synchronization with each other;

providing a first time reference message to a first node on said first downstream channel, said first time reference being generated by said first time reference device; and receiving data from said first node at said Head End via said second upstream channel.

2. The method of claim 1 further comprising using said first time reference message to synchronize a time reference device within said first node with said first time reference device.

3. The method of claim 1 further including:

providing time reference data to each of the plurality of access controllers; and simultaneously loading, at each of the plurality of access controllers, and time reference data into its respective time reference device to thereby cause each of the time reference devices to be synchronized with each other.

4. The method of claim 3 further comprising: asserting a DATA$_{13}$ VALID signal to access controller to thereby cause each access controller to load said time reference data within an internal memory device; and de-asserting sad DATA_VALID signal to thereby cause each access controller to stop loading data into the internal memory device.

5. The method of claim 4 wherein said loading includes simultaneously providing a LOAD_DATA signal to each access controller to thereby cause each access controller to simultaneously load the time reference data from its internal memory device into its time reference device.

6. The method of claim 4 wherein said loading includes each access controller automatically loading the time reference data from its internal memory device into its time reference device at predefined time after DATA_VALID signal has been de-asserted.

7. The method of claim 1 further comprising providing time reference synchronization messages from the Head End to the plurality of network nodes.

8. The method of claim 7 wherein a first plurality of network nodes belong to first DOCSIS domain, and a second plurality of network nodes belong to a second DOCSIS domain.

9. The method of claim 1 wherein said access network is a wireless network.

10. The method of claim 1 wherein said access network is a cable network, said plurality of nodes are cable modems, and wherein said access control system is a Cable Modem Termination System (CMTS).

11. The method of claim 10 wherein said first and second access controllers are Media Access Control (MAC) devices residing on different physical line cards within the CMTS, said first and secoond controllers being configured or designed to operate in accordance with a DOCSIS standard.

12. The method of claim 1 further including generating at least one synchronization signal from a synchronization device, said synchronization signal including time reference data to be used to synchronize each of the plurality of access controllers in the access control system.

13. The method of claim 1 wherein the synchronization signal is provided at periodic intervals to the first and second access controllers.

14. A method of configuring a cable network, cable network comprising a Head End and a plurality of nodes, the Head End including an access control system having a plurality of media access controllers, each of the plurality of media access controllers controlling a respective interface to the cable network, each of the plurality of media access controllers including a distinct time reference device, each interface including a distinct plurality of ports for communicating with a least a portion of the plurality of nodes, wherein said plurality of nodes includes cable modems, and wherein said access control system includes a Cable Modem Termination System (CMTS), the method comprising:

synchronizing the time reference devices in each of the plurality of access controllers; and assigning selected ports from the plurality of interfaces to domain domains within the cable networks;

wherein said assigning includes assigning at least one port from a first interface to a first domain, and assigning at least one port from a second interface to said first domain;

wherein said first and second domains are different DOCSIS domains.

15. The method of claim 14 wherein said first interface resides on a first physical line card within the access control system, and the second interface resides on a second physical line card within the access control system.

16. The method of claim 14 wherein said first domain includes at least two downstream channels.

17. The method of claim 14 wherein said first domain includes a first plurality of ports, said first plurality of ports including at least two downstream channel transmitters.

18. A method for synchronizing nodes in a cable network to a common time reference, the cable network comprising a Head End and a plurality of nodes, the Head End including an access control system having a plurality of media access controllers, each of the plurality of media access controllers controlling a respective interface to the cable network, each of the plurality of media access controllers including a distinct time referene device, each interface including a distinct plurality of ports for communicating with at least a portion of the plurality of nodes, wherein the plurality of nodes include cable modems, and wherein the access control system includes a Cable Modem Termination System (CMTS), the method comprising:

providing a first time reference message to a first node via a first downstream channel, the first downstream channel being associated with a first media access controller and a first interface, the first time reference being generated from a first time reference device associated with the first media access controller;

providing a second time reference message to a second node via a second downstream channel, the secon downstream channel being associated with a second media access controller and a second interface, the second time reference message being generated from a second time reference device associated with the second media access controller, wherein said first and second time referenfe devices are synchronized with each other; and synchronizing said first and second nodes by using said first time references message to synchronize a time reference device of said first node with said first time reference device, and using said second time reference message to synchronize a second time reference device of said second node with said second time reference device;

wherein said first and second access controllers are Media Access Control (MAC) devices residing on different physical line cards within CMTS;

wherein said first and second nodes are cable modems associated with a first DOCSIS domain.

19. The method of claim 18 wherein said first access controller and said first interface reside on a first physical line card within the access control system, and the second access controller and second interface reside on a second physical line card within the access control system.

20. The method of claim 18 wherein said first node is a cable modem belonging to a first DOCSIS domain, and said second node is a cable modem belonging to a second DOCSIS domain.

21. A computer program product for synchronizing interfaces of an access network, the access network comprising a Head End and a plurality of nodes, the Head End including an access control system having a plurality of slave media access controllers, each slave media access controller controlling a respective interface to the access network, the plurality of slave media access controllers including a first distinct access controller for controlling a first interface, said first access controller including a first time reference device, said first interface including a first distinct plurality of ports for communicating with at least a first portion of the plurality of nodes, the plurality of access controllers further including a second distinct access controller for controlling a second interface, said second access controller including a second time reference device, said second interface including a second distinct plurality of ports for communicating with at least a second portion of the plurality of nodes, wherein said first access controller and said first interface reside on a first physical line card within the access control system, wherein the second access controllers and second interface reside on a second physical line card within the access control system, wherein said first plurality of ports includes a first downstream channel transmitter and at least one first upstream channel receiver, wherein the second plurality of ports includes a second downstream channel transmitter and at least one second upstream channel receiver, the computer program product comprising:

a computer usable medium having computer readable code embodied therein, the computer readable code comprising:

computer code for providing at least one synchronization signal to said first and second access controllers; and computer code for utilizing, at said first and second access controllers, and at least one synchronizatioin signal in a manner in which results in the first and second time reference devices being in synchronization with each other;

computer code for providing a first time reference message to a first node on said first downstream channel, said first time reference being generated by said first time reference device; and computer code for receiving data from said first node at said Head End via said second upstream channel.

22. The computer program product of claim 21 wherein said access network is a cable network, said plurality of nodes are cable modems, and wherein said access control system is a Cable Modem Termination System (CMTS).

23. The computer program product of claim 21 further including:

computer code for providing time reference data to each of the plurality of access controllers; and computer code for loading, at each of the plurality of access controllers, said time reference data into its respective time reference device to thereby cause each of the time reference devices to be synchronized with each other.

24. A computer program product of configuring an access network, the access network comprising a Head End and a plurality of nodes, the Head End including an access control system having a plurality of slave media access controllers, each of the plurality of slave media access controllers controlling a respective interface to the access network, each of the plurality of slave media access controllers including a distinct time reference device, each interface including a plurality of distinct ports for communicating with at least a portion of the plurality of nodes, the computer program product comprising a computer usable medium having computer readable code embodied therein, the computer readable code comprising:

computer code for synchronizing the time reference devices in each of the plurality of access controllers; and computer code for assigning selected ports from the plurality of interfaces to particular domains within the access network;

wherein said assigning code includes computer code for assigning at least one port from a first interface to a first domain, and computer code for assigning at least one port from a second interface to said first domain;

wherein said access network is a cable network, said plurality of nodes are cable modems, and wherein said access control system is a Cable Modem Termination System (CMTS);

wherein said first and second domains are different DOCSIS domains.

25. A computer program product for synchronizing nodes in cable network to a common time reference, the cable network comprising a Head End and a plurality of nodes, the Head End including an access control system having a plurality of slave media access controllers, each of the plurality of slave media access controllers controlling a respective interface to the cable network, each of the plurality of slave media access controllers including a distinct time reference device, each interface including a plurality of distinct ports for communicating with at least a portion of the plurality of nodes, the computer program product comprising:

a computer usable medium having computer readable code embodied therein, the computer readable code comprising:

computer code for providing a first time reference message to a first node via a first downstream channel, the first downstream channel being associated with a first slave media access controller and a first interface, the first time reference message being generated from a first time reference device associated with the first slave media access controller;

computer code for providing a second time reference message to a second node via a second downstream channel, the second downstream channel being associated with a second slave media access controller and a second interface, the second time reference message being generated from a second time reference device associated with the second slave media access controller, wherein said first and second time reference devices are synchronized with each other; and computer code for synchronizing and first and second nodes by using said first time reference message to synchronize a time reference device of said first node with said first time reference device, and using said second time reference message to synchronize a second time reference device of said second node with said second time reference device;

wherein said cable network is a cable network, said plurality of nodes are cable modems, and wherein said access control system is a Cable Modem Termination System (CMTS);

wherein said first and second access controllers are Media Access Control (MAC) devices residing on different physical line cards within the CMTS, said first and second access controllers being configured or designed to operate in accordance with a DOCSIS standard;

wherein said first and second nodes are cable modems beloning to a first DOCSIS domain.

26. An apparatus for synchronizing time reference devices in an access network, the access network comprising a Head End and a plurality of nodes, the Head End including an access control system having a plurality of media access controllers, each media access controller controlling a respective interface to the access network, the plurality of media access controllers including a first distinct access controller for controlling a first interface, said first access controller including a first time reference device, said first interface including a first distinct plurality of ports for communicating with at least a first portion of the plurality of nodes, the plurality of access controllers further including a second distinct access controller for controlling a second interface, said second access controller including a second time reference device, said second interface including a second distinct plurality of ports for communicating with at least a second portion of the plurality of nodes, wherein said first access controller and said first interface reside on a first physical line card within the access control system, wherein the second access controller and second interface reside on a second physical line card within the access control system, wherein said first plurality of ports includes a first downstream channel transmitter and at least one first upstream channel receiver, wherein the second plurality of ports includes a second downstream channel transmitter and at least one second upstream channel receiver, the apparatus comprising:

means for providing at least one synchronization signal to said first and second access controllers;

means for utilizing, at said first and second access controllers, said at least one synchronization signal in a manner which results in the first and second time reference devices being in synchronization with each other;

means for providing a first time reference message to a first node on said first downstream channel, said first time reference being generated by said first time reference device; and means for receiving data from said first node at said Head End via said second upstream channel.

27. An apparatus for synchronizing time reference devices in an access network, the access network comprising a Head End and a plurality of nodes, the Head End including an access control system having a plurality of media access controllers, each media access controller controlling a respective interface to the access network, the plurality of media access controllers including a first distinct access controller for controlling a first interface, said first access controller including a first time reference device, said first interface including a first distinct plurality of ports for communicating with at least a first portion of the plurality of nodes, the plurality of access controllers further including a second distinct access controller for controlling a second interface, said second access controller including a second time reference device, said second interface including a second distinct plurality of ports for communicating with at least a second portion of the plurality of nodes, wherein said first access controller and said first interface reside on a first physical line card within the access control system, wherein the second access controller and second interface reside on a second physical line card within the access control system, wherein said first plurality of ports includes a first downstream channel transmitter and at least one first upstream channel receiver, wherein the second plurality of ports includes a second downstream channel transmitter and at least one second upstream channel receiver, the apparatus comprising:

a processor; and a memory;

the apparatus being adapted for:

providing at least one synchronization signal to said first and second access controllers; utilizing, at said first and second access controllers, said at least one synchronization signal in a manner which results in the first and second time reference devices being in synchronization with each other;

providing a first time reference message to a first node on said first downstream channel, said first time reference being generated by said first time reference device; and receiving data from said first node at said Head End via said second upstream channel.

28. An apparatus for configuring an access network, the access network comprising a Head End and a plurality of nodes, the Head End including an access control system having a plurality of media access controllers, each of the plurality of media access controllers controlling respective interface to the access network, each of the plurality of media access controllers including a distinct time reference device, each interface including a distinct plurality of ports for communicating with at least a portion of the plurality of nodes, comprising:

a processor; and a memory;

the apparatus being adapted for:

synchronizing the time reference devices in each of the plurality of access controllers; and assigning selected ports from the plurality of interfaces to particular domains within the access network;

wherein said assigning includes assigning at least one port from a first interface to a first domain, and assigning at least one port from a second interface to said first domain;

wherein said access network is a cable network, said plurality of nodes are cable modems, and wherein said access control system is a Cable Modem Termination System (CMTS);

wherein said first and second domains are different DOCSIS domains.

29. An apparatus for configuring an access network, the access network comprising a Head End and a plurality of nodes, the Head End including an access control system having a plurality of media access controllers, each of the plurality of media access controllers controlling a respective interface to the access network, each of the plurality of media access controllers including a distinct time reference device, each interface including a distinct plurality of ports for communicating with at least a portion of the plurality of nodes, comprising:

means for synchronizing the time reference devices in each of the plurality of access controllers; and means for assigning selected ports from the plurality of interfaces to particular domains within the access network;

wherein said assigning means includes means for assigning at least one port from a first interface to a first domain, and assigning at least one port from a second interface to said first domain;

wherein said access network is a cable network, said plurality of nodes are cable modems, and wherein said access control system is a Cable Modem Termination System (CMTS);

wherein said first and second domains are different DOCSIS domains.

30. An apparatus for synchronizing nodes in cable network to a common time reference, the cable network comprising a Head End and a plurality of nodes, the Head End including an access control system having a plurality of media access controllers, each of the plurality of media access controllers controlling a respective interface to the cable network, each of the plurality of media access controllers including a distinct time reference device, each interface including a distinct plurality of ports for communicating with at least a portion of the plurality of nodes, wherein said plurality of nodes includes cable modems, and wherein said access control system includes a Cable Modem Termination System (CMTS), the apparatus comprising:

means for providing a first time reference message to a first node via a first downstream channel, the first downstream channel being associated with a first media access controller and a first interface, the first time reference message being generated from a first time reference device associated with the first media access controller;

means for providing a second time reference message to a second node via a second downstream channel, the second downstream channel being associated with a second media access controller and a second interface, the second time reference message being generated from a second time reference device associated with the second media access controller, wherein said first and second time reference devices are synchronized with each other; and means for synchronizing said first and second nodes by using said first time reference message to synchronize a time reference device of said first node with said first time reference device, and using said second time reference message to synchronize a second time reference device of said second node with said second time reference device; devices residing on different physical line cards within the CMTS, said first and second access controllers being configured or designed to operate in accordance with a DOCSIS standard;

wherein said first and second nodes are cable modems belonging to a first DOCSIS domain.

31. An apparatus for synchronizing nodes in an access network to a common time reference, the access network comprising a Head End and a plurality of nodes, the Head End including an access control system having a plurality of media access controllers, each of the plurality of media access controllers controlling a respective interface to the access network, each of the plurality of media access controllers including a distinct time reference device, each interface including a distinct plurality of ports for communicating with at least a portion of the plurality of nodes, comprising:

a processor; and a memory;

the apparatus being adapted for:

providing a first time reference message to a first node via a first downstream channel, the first downstream channel being associated with a first media access controller and a first interface, the first time reference message being generated from a first time reference device associated with the first media access controller;

providing a second time reference message to a second node via a second downstream channel, the second downstream channel being associated with a second media access controller and a second interface, the second time reference message being generated from a second time reference device associated with the second media access controller, wherein said first and second time reference devices are synchronized with each other; and synchronizing said first and second nodes by using said first time reference message to synchronize a time reference device of said first node with said first time reference device, and using said second time reference message to synchronize a second time reference device of said second node with said second time reference device;

wherein said access network is a cable network, said plurality of nodes are cable modems, and wherein said access control system is a Cable Modem Termination System (CMTS);

wherein said first and second access controllers are Media Access Control (MAC) devices residing on different physical line cards within the CMTS, said first and second access controllers being configured or designed to operate in accordance with a DOCSIS standard;

wherein said first and second nodes are cable modems belonging to a first DOCSIS domain.

* * * * *